United States Patent
Nam et al.

(10) Patent No.: US 11,621,819 B2
(45) Date of Patent: Apr. 4, 2023

(54) DATA-MODULATED DEMODULATION REFERENCE SIGNALS

(71) Applicant: QUALCOMM Incorporated, San Diego, CA (US)

(72) Inventors: Wooseok Nam, San Diego, CA (US); Juan Montojo, San Diego, CA (US); Tao Luo, San Diego, CA (US); Ahmed Abdelaziz Ibrahim Abdelaziz Zewail, San Diego, CA (US); Zhifei Fan, San Diego, CA (US); Xiaoxia Zhang, San Diego, CA (US); Jing Sun, San Diego, CA (US); Arumugam Chendamarai Kannan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 31 days.

(21) Appl. No.: 17/302,814

(22) Filed: May 12, 2021

(65) Prior Publication Data

US 2021/0359817 A1  Nov. 18, 2021

Related U.S. Application Data

(60) Provisional application No. 63/024,003, filed on May 13, 2020, provisional application No. 63/024,006, filed on May 13, 2020.

(51) Int. Cl.
*H04L 5/00* (2006.01)
*H04W 8/24* (2009.01)
*H04L 1/00* (2006.01)

(52) U.S. Cl.
CPC .......... *H04L 5/0051* (2013.01); *H04L 1/0003* (2013.01); *H04L 1/0061* (2013.01); *H04W 8/24* (2013.01)

(58) Field of Classification Search
None
See application file for complete search history.

(56) References Cited

U.S. PATENT DOCUMENTS

| | | | |
|---|---|---|---|
| 10,856,280 B2 * | 12/2020 | Noh | H04W 76/27 |
| 2019/0052425 A1 * | 2/2019 | Kim | H04L 5/0064 |
| 2019/0090199 A1 * | 3/2019 | Kim | H04W 52/143 |
| 2019/0296876 A1 * | 9/2019 | Zhang | H04L 5/0051 |
| 2019/0327048 A1 * | 10/2019 | Hosseini | H04B 7/0697 |
| 2020/0322201 A1 * | 10/2020 | Kuchi | H04L 27/26412 |
| 2021/0045160 A1 * | 2/2021 | Irukulapati | H04W 74/0833 |
| 2021/0359810 A1 * | 11/2021 | Nam | H04L 5/0048 |

FOREIGN PATENT DOCUMENTS

EP  3930412 A1 * 12/2021

* cited by examiner

*Primary Examiner* — Anh Vu H Ly
(74) *Attorney, Agent, or Firm* — Harrity & Harrity, LLP

(57) ABSTRACT

Various aspects of the present disclosure generally relate to wireless communication. In some aspects, a user equipment (UE) may transmit an indication of a capability of the UE to communicate one or more of uplink communications or downlink communications that include data-modulated demodulation reference signals (DMRSs) in which each of one or more resources of a plurality of resources of the uplink communications or the downlink communications carry both at least a portion of a DMRS sequence and data. The UE may transmit an uplink communication or receive a downlink communication that includes the data-modulated DMRSs. Numerous other aspects are provided.

30 Claims, 10 Drawing Sheets

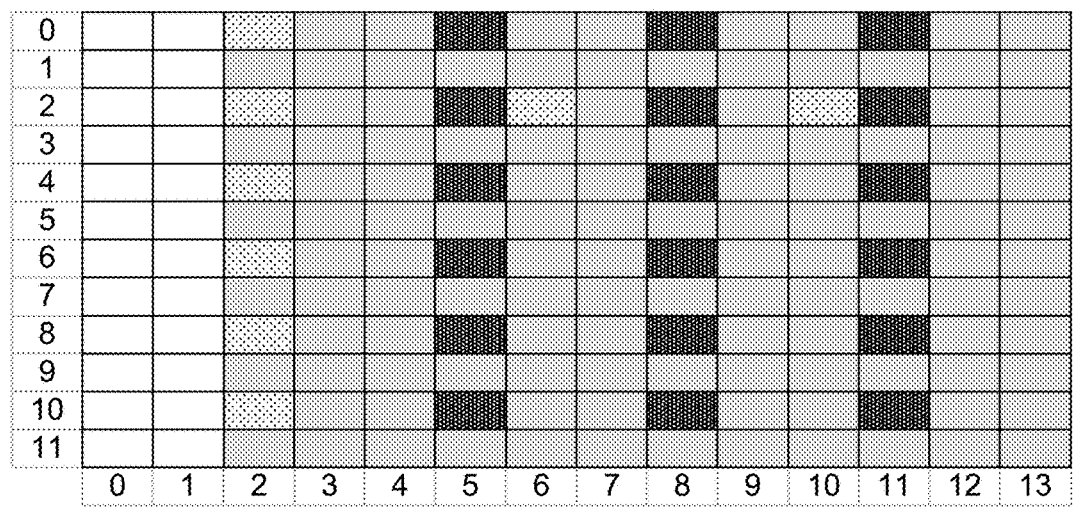
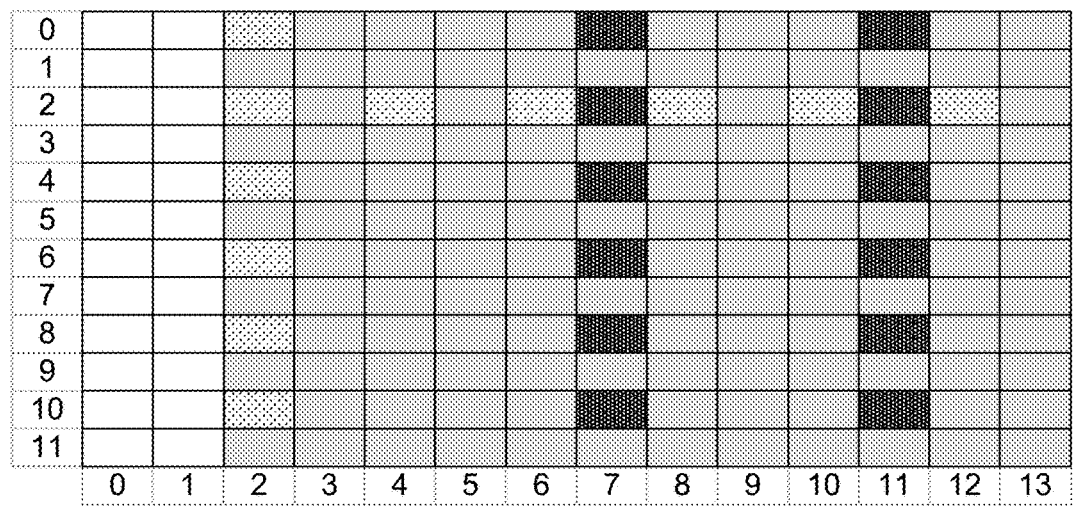
☐ Control Channel Resource
▨ Data-allocated Shared Channel Resource
▦ Baseline DMRS/PT-RS Resource
■ Data-Modulated DMRS Resource
FIGURE 4

DATA-MODULATED DEMODULATION REFERENCE SIGNALS

CROSS-REFERENCE TO RELATED APPLICATION

This Patent application claims priority to Provisional Patent Application No. 63/024,003, filed on May 13, 2020, entitled "DATA-MODULATED DEMODULATION REFERENCE SIGNALS," and assigned to the assignee hereof. This Patent Application also claims priority to Provisional Patent Application No. 63/024,006, filed on May 13, 2020, entitled "TRANSPORT BLOCK SIZE DETERMINATION FOR TRANSMISSIONS WITH DATA-MODULATED DEMODULATION REFERENCE SIGNALS," and assigned to the assignee hereof. The disclosure of the prior Applications are considered part of and are incorporated by reference in this Patent Application.

FIELD OF THE DISCLOSURE

Aspects of the present disclosure generally relate to wireless communication and specifically, to techniques and apparatuses for data-modulated demodulation reference signals.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth or transmit power). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different user equipments (UEs) to communicate on a municipal, national, regional, and even global level. New Radio (NR), which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM or SC-FDMA (for example, also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements are applicable to other multiple access technologies and the telecommunication standards that employ these technologies.

In some communication networks, a transmitting device may include demodulation reference signals (DMRSs) in a transmitted communication to improve channel estimation by a receiving device. In some scenarios (for example, in a high speed scenario or a high Doppler scenario), the transmitting device may transmit DMRSs on one symbol of the transmitted communication (for example, a baseline DMRS pattern) or on two or more symbols of the transmitted communication (for example, a baseline DMRS with additional DMRS patterns). However, when DMRSs are transmitted on symbols of a communication, the DMRSs may increase overhead and reduce throughput of the communication.

SUMMARY

In some aspects, a method of wireless communication performed by a user equipment (UE) includes transmitting an indication of a capability of the UE to communicate one or more of uplink communications or downlink communications that include data-modulated demodulation reference signals (DMRSs) in which each of one or more resources of a plurality of resources of the uplink communications or the downlink communications carry both at least a portion of a DMRS sequence and data; and transmitting an uplink communication or receiving a downlink communication that includes the data-modulated DMRSs.

In some aspects, a method of wireless communication performed by a base station includes receiving an indication of a capability of a UE to communicate one or more of uplink communications or downlink communications that include data-modulated DMRSs in which each of one or more resources of a plurality of resources of the uplink communications or the downlink communications carry both at least a portion of a DMRS sequence and data; and transmitting a downlink communication to the UE or receiving an uplink communication from the UE that includes the data-modulated DMRSs.

In some aspects, a method of wireless communication performed by a wireless communication device includes determining a size of a transport block based at least in part on resources, of a physical shared channel, that are allocated for data-modulated DMRSs in which each of one or more resources of the resources carries both a DMRS and data; and transmitting a communication, via the physical shared channel, based at least in part on the size of the transport block that includes the data-modulated DMRSs.

In some aspects, a method of wireless communication performed by a wireless communication device includes determining a size of a transport block that is based at least in part on resources, of a physical shared channel, that are allocated for data-modulated DMRSs in which each of one or more resources of the resources carries both a DMRS and data; and receiving a communication, via the physical shared channel, based at least in part on the size of the transport block that includes the data-modulated DMRSs.

In some aspects, a UE for wireless communication includes a memory; and one or more processors, coupled to the memory, configured to: transmit an indication of a capability of the UE to communicate one or more of uplink communications or downlink communications that include data-modulated DMRSs in which each of one or more resources of a plurality of resources of the uplink communications or the downlink communications carry both at least a portion of a DMRS sequence and data; and transmit an uplink communication or receiving a downlink communication that includes the data-modulated DMRSs.

In some aspects, a base station for wireless communication includes a memory; and one or more processors, coupled to the memory, configured to: receive an indication of a capability of a UE to communicate one or more of uplink communications or downlink communications that include data-modulated DMRSs in which each of one or more resources of a plurality of resources of the uplink communications or the downlink communications carry both at least a portion of a DMRS sequence and data; and transmit a downlink communication to the UE or receiving an uplink communication from the UE that includes the data-modulated DMRSs.

In some aspects, a wireless communication device for wireless communication includes a memory; and one or more processors, coupled to the memory, configured to: determine a size of a transport block based at least in part on resources, of a physical shared channel, that are allocated for data-modulated DMRSs in which each of one or more resources of the resources carries both a DMRS and data; and transmit a communication, via the physical shared channel, based at least in part on the size of the transport block that includes the data-modulated DMRSs.

In some aspects, a wireless communication device for wireless communication includes a memory; and one or more processors, coupled to the memory, configured to: determine a size of a transport block that is based at least in part on resources, of a physical shared channel, that are allocated for data-modulated DMRSs in which each of one or more resources of the resources carries both a DMRS and data; and receive a communication, via the physical shared channel, based at least in part on the size of the transport block that includes the data-modulated DMRSs.

In some aspects, a non-transitory computer-readable medium storing a set of instructions for wireless communication includes one or more instructions that, when executed by one or more processors of a UE, cause the UE to: transmit an indication of a capability of the UE to communicate one or more of uplink communications or downlink communications that include data-modulated DMRSs in which each of one or more resources of a plurality of resources of the uplink communications or the downlink communications carry both at least a portion of a DMRS sequence and data; and transmit an uplink communication or receiving a downlink communication that includes the data-modulated DMRSs.

In some aspects, a non-transitory computer-readable medium storing a set of instructions for wireless communication includes one or more instructions that, when executed by one or more processors of a base station, cause the base station to: receive an indication of a capability of a UE to communicate one or more of uplink communications or downlink communications that include data-modulated DMRSs in which each of one or more resources of a plurality of resources of the uplink communications or the downlink communications carry both at least a portion of a DMRS sequence and data; and transmit a downlink communication to the UE or receiving an uplink communication from the UE that includes the data-modulated DMRSs.

In some aspects, a non-transitory computer-readable medium storing a set of instructions for wireless communication includes one or more instructions that, when executed by one or more processors of a wireless communication device, cause the wireless communication device to: determine a size of a transport block based at least in part on resources, of a physical shared channel, that are allocated for data-modulated DMRSs in which each of one or more resources of the resources carries both a DMRS and data; and transmit a communication, via the physical shared channel, based at least in part on the size of the transport block that includes the data-modulated DMRSs.

In some aspects, a non-transitory computer-readable medium storing a set of instructions for wireless communication includes one or more instructions that, when executed by one or more processors of a wireless communication device, cause the wireless communication device to: determine a size of a transport block that is based at least in part on resources, of a physical shared channel, that are allocated for data-modulated DMRSs in which each of one or more resources of the resources carries both a DMRS and data; and receive a communication, via the physical shared channel, based at least in part on the size of the transport block that includes the data-modulated DMRSs.

In some aspects, an apparatus for wireless communication includes means for transmitting an indication of a capability of the apparatus to communicate one or more of uplink communications or downlink communications that include data-modulated DMRSs in which each of one or more resources of a plurality of resources of the uplink communications or the downlink communications carry both at least a portion of a DMRS sequence and data; and means for transmitting an uplink communication or receiving a downlink communication that includes the data-modulated DMRSs.

In some aspects, an apparatus for wireless communication includes means for receiving an indication of a capability of a UE to communicate one or more of uplink communications or downlink communications that include data-modulated DMRSs in which each of one or more resources of a plurality of resources of the uplink communications or the downlink communications carry both at least a portion of a DMRS sequence and data; and means for transmitting a downlink communication to the UE or receiving an uplink communication from the UE that includes the data-modulated DMRSs.

In some aspects, an apparatus for wireless communication includes means for determining a size of a transport block based at least in part on resources, of a physical shared channel, that are allocated for data-modulated DMRSs in which each of one or more resources of the resources carries both a DMRS and data; and means for transmitting a communication, via the physical shared channel, based at least in part on the size of the transport block that includes the data-modulated DMRSs.

In some aspects, an apparatus for wireless communication includes means for determining a size of a transport block that is based at least in part on resources, of a physical shared channel, that are allocated for data-modulated DMRSs in which each of one or more resources of the resources carries both a DMRS and data; and means for receiving a communication, via the physical shared channel, based at least in part on the size of the transport block that includes the data-modulated DMRSs.

Aspects generally include a method, apparatus, system, computer program product, non-transitory computer-readable medium, user equipment, base station, wireless communication device, or processing system as substantially described with reference to and as illustrated by the drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

FIGS. 3 and 4 are diagrams illustrating examples associated with data-modulated demodulation reference signals, in accordance with the present disclosure.

DETAILED DESCRIPTION

Figure 1:
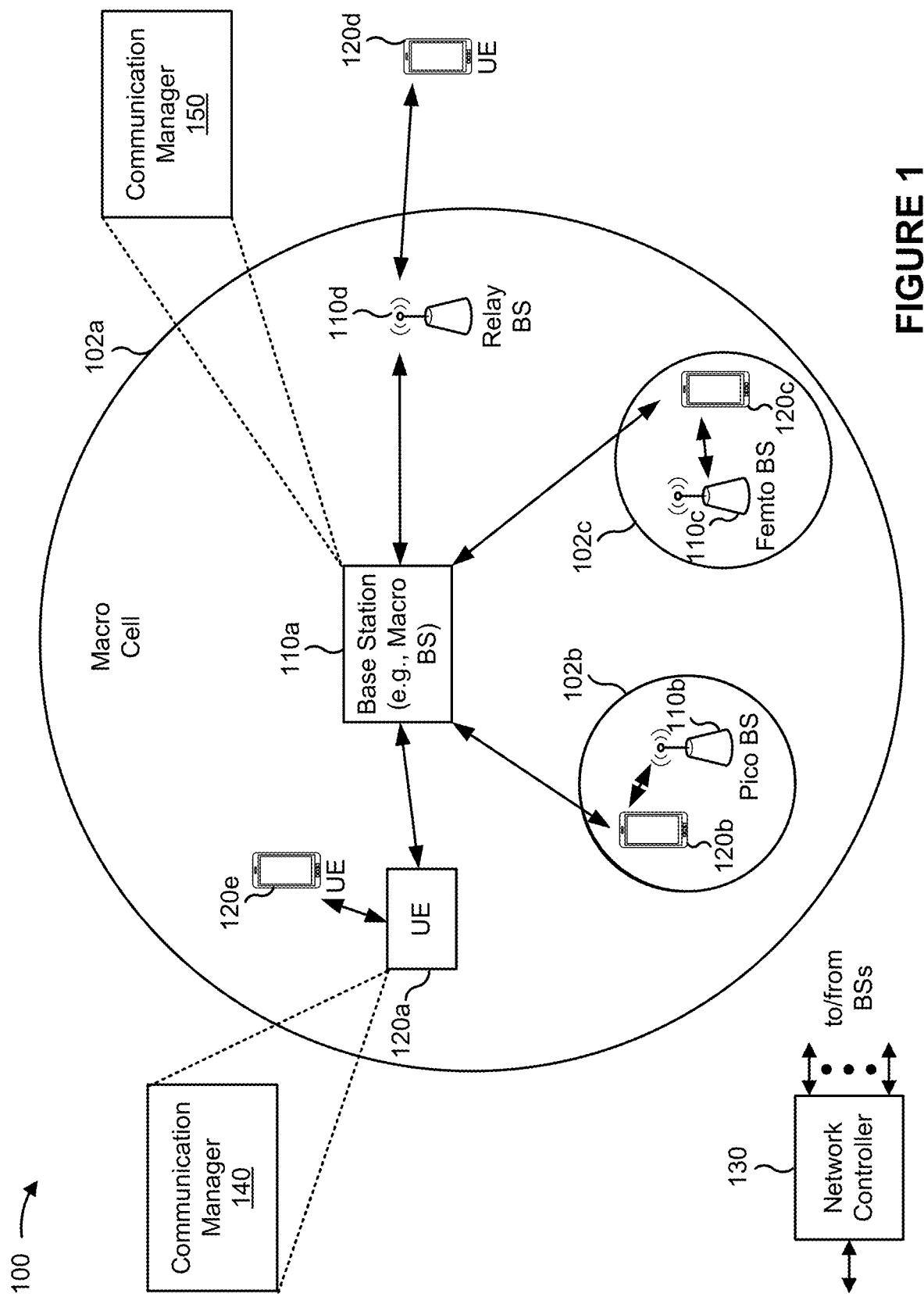
FIG. 1 is a diagram illustrating an example of a wireless network in accordance with the present disclosure.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

Various aspects relate generally to communicating using data-modulated demodulation reference signals (DMRSs) based at least in part on an indicated capability of a user equipment (UE). Some aspects more specifically relate to communicating using data multiplexed with DMRSs on or more DMRS symbols of a communication based at least in part on a UE indication of a capability to communicate using the data multiplexed with the DMRSs on the one or more DMRS symbols of the communication. In some aspects, the UE may request to use data modulation on the one or more DMRS symbols of the communication based at least in part on the communication having a relatively high (for example, more than the baseline pattern) number of DMRSs (for example, the relatively high number of DMRSs may be configured to improve channel estimation by a receiving device, such as a base station or the UE). The receiving device may determine that the number of DMRSs, which may be configured for multiple UEs, may be more than what is necessary for channel estimation based at least in part on the number of DMRSs having only DMRS sequences. The receiving device or a transmitting device may request to use data-modulated DMRSs to increase spectral efficiency by increasing an amount of data that can be communicated via the channel based at least in part on multiplexing data with at least a portion of a DMRS sequence onto resources allocated for the one or more of the DMRSs. The data may be multiplexed with at least a portion of the DMRS sequence based at least in part on modulation of the DMRS sequence.

Particular aspects of the subject matter described in this disclosure can be implemented to realize one or more of the following potential advantages. In some examples, the described techniques can be used to conserve computing, network, or communication resources by increasing throughput of a communication, which may reduce a quantity of communications to transmit buffered data, a quantity of resources used to transmit the communication, or provide other benefits. For example, a UE that is configured to communicate with an excessive quantity of DMRS symbols may improve spectral efficiency of communications based at least in part on multiplexing data onto at least one of the DMRS symbols. Additionally or alternatively, having the UE indicate a capability to use data-modulated DMRSs may allow for a base station to allocate a quantity of DMRSs that is excessive to one or more UEs in a cell of the base station, while allowing the one or more UEs to utilize the excessive DMRSs to carry data.

FIG. 1 is a diagram illustrating an example of a wireless network in accordance with the present disclosure. The wireless network may be or may include elements of a 5G (NR) network or an LTE network, among other examples. The wireless network may include one or more base stations 110 (shown as BS 110*a*, BS 110*b*, BS 110*c*, and BS 110*d*)

and other network entities. A base station (BS) is an entity that communicates with UEs and may also be referred to as an NR BS, a Node B, a gNB, a 5G node B (NB), an access point, or a transmit receive point (TRP), among other examples. Each BS may provide communication coverage for a particular geographic area. In 3GPP, the term "cell" can refer to a coverage area of a BS or a BS subsystem serving this coverage area, depending on the context in which the term is used.

A BS may provide communication coverage for a macro cell, a pico cell, a femto cell, or another type of cell. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A BS for a macro cell may be referred to as a macro BS. A BS for a pico cell may be referred to as a pico BS. A BS for a femto cell may be referred to as a femto BS or a home BS. A BS may support one or multiple (for example, three) cells.

The wireless network may be a heterogeneous network that includes BSs of different types, such as macro BSs, pico BSs, femto BSs, or relay BSs. These different types of BSs may have different transmit power levels, different coverage areas, and different impacts on interference in the wireless network. For example, macro BSs may have a high transmit power level (for example, 5 to 40 watts) whereas pico BSs, femto BSs, and relay BSs may have lower transmit power levels (for example, 0.1 to 2 watts). In the example shown in FIG. 1, a BS 110a may be a macro BS for a macro cell 102a, a BS 110b may be a pico BS for a pico cell 102b, and a BS 110c may be a femto BS for a femto cell 102c. A network controller 130 may couple to the set of BSs 102a, 102b, 110a and 110b, and may provide coordination and control for these BSs. Network controller 130 may communicate with the BSs via a backhaul. The BSs may also communicate with one another, for example, directly or indirectly via a wireless or wireline backhaul.

In some aspects, a cell may not be stationary, rather, the geographic area of the cell may move in accordance with the location of a mobile BS. In some aspects, the BSs may be interconnected to one another or to one or more other BSs or network nodes (not shown) in the wireless network through various types of backhaul interfaces, such as a direct physical connection or a virtual network, using any suitable transport network.

The wireless network may also include relay stations. A relay station is an entity that can receive a transmission of data from an upstream station (for example, a BS or a UE) and send a transmission of the data to a downstream station (for example, a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, or a relay, among other examples.

UEs 120 (for example, 120a, 120b, 120c) may be dispersed throughout the wireless network, and each UE may be stationary or mobile. A UE may also be referred to as an access terminal, a terminal, a mobile station, a subscriber unit, or a station, among other examples. A UE may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless medium.

Some UEs may be considered machine-type communication (MTC) or evolved or enhanced machine-type communication (eMTC) UEs. MTC and eMTC UEs include, for example, robots, drones, remote devices, sensors, meters, monitors or location tags, among other examples, that may communicate with a base station, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices, or may be implemented as NB-IoT (narrowband internet of things) devices. Some UEs may be considered a Customer Premises Equipment (CPE). UE 120 may be included inside a housing that houses components of UE 120, such as processor components or memory components, among other examples.

In general, any quantity of wireless networks may be deployed in a given geographic area. Each wireless network may support a particular radio access technology (RAT) and may operate on one or more frequencies or frequency channels. A frequency may also be referred to as a carrier among other examples. Each frequency may support a single RAT in a given geographic area in order to avoid interference between wireless networks of different RATs. In some cases, NR or 5G RAT networks may be deployed.

In some aspects, two or more UEs 120 (for example, shown as UE 120a and UE 120e) may communicate directly with one another using one or more sidelink channels (for example, without using a base station 110 as an intermediary). For example, the UEs 120 may communicate using peer-to-peer (P2P) communications, device-to-device (D2D) communications, a vehicle-to-everything (V2X) protocol (for example, which may include a vehicle-to-vehicle (V2V) protocol or a vehicle-to-infrastructure (V2I) protocol), a mesh network, or a combination thereof. In such examples, the UE 120 may perform scheduling operations, resource selection operations, or other operations described elsewhere herein as being performed by the base station 110.

Devices of the wireless network may communicate using the electromagnetic spectrum, which may be subdivided based on frequency or wavelength into various classes, bands, or channels. For example, devices of the wireless network may communicate using an operating band having a first frequency range (FR1), which may span from 410 MHz to 7.125 GHz. As another example, devices of the wireless network may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30

GHz-300 GHz) which is identified by the International Telecommunications Union (ITU) as a "millimeter wave" band. Thus, unless specifically stated otherwise, it should be understood that the term "sub-6 GHz" may broadly represent frequencies less than 6 GHz, frequencies within FR1, mid-band frequencies (for example, greater than 7.125 GHz), or a combination thereof. Similarly, unless specifically stated otherwise, it should be understood that the term "millimeter wave" may broadly represent frequencies within the EHF band, frequencies within FR2, mid-band frequencies (for example, less than 24.25 GHz), or a combination thereof. The frequencies included in FR1 and FR2 may be modified, and techniques described herein are applicable to those modified frequency ranges.

In some aspects, the UE 120 may include a communication manager 140. As described in more detail elsewhere herein, the communication manager 140 may transmit an indication of a capability of the UE to communicate one or more of uplink communications or downlink communications that include data-modulated DMRSs in which each of one or more resources of a plurality of resources of the uplink communications or the downlink communications carry both at least a portion of a DMRS sequence and data; and transmit an uplink communication or receiving a downlink communication that includes the data-modulated DMRSs. Additionally or alternatively, the communication manager 140 may perform one or more other operations described herein.

In some aspects, the base station 110 may include a communication manager 150. As described in more detail elsewhere herein, the communication manager 150 may receive an indication of a capability of a UE to communicate one or more of uplink communications or downlink communications that include data-modulated DMRSs in which each of one or more resources of a plurality of resources of the uplink communications or the downlink communications carry both at least a portion of a DMRS sequence and data; and transmit a downlink communication to the UE or receiving an uplink communication from the UE that includes the data-modulated DMRSs. Additionally or alternatively, the communication manager 150 may perform one or more other operations described herein.

In some aspects, a wireless communication device (for example, the UE 120 or the base station 110) may include a communication manager 140 or 150. As described in more detail elsewhere herein, the communication manager 140 or 150 may determine a size of a transport block based at least in part on resources, of a physical shared channel, that are allocated for data-modulated DMRSs in which each of one or more resources of the resources carries both a DMRS and data; and transmit a communication, via the physical shared channel, based at least in part on the size of the transport block that includes the data-modulated DMRSs. Additionally or alternatively, the communication manager 140 or 150 may perform one or more other operations described herein.

In some aspects, the wireless communication device may include a communication manager 140 or 150. As described in more detail elsewhere herein, the communication manager 140 or 150 may determine a size of a transport block that is based at least in part on resources, of a physical shared channel, that are allocated for data-modulated DMRSs in which each of one or more resources of the resources carries both a DMRS and data; and receive a communication, via the physical shared channel, based at least in part on the size of the transport block that includes the data-modulated DMRSs. Additionally or alternatively, the communication manager 140 or 150 may perform one or more other operations described herein.

Figure 2:
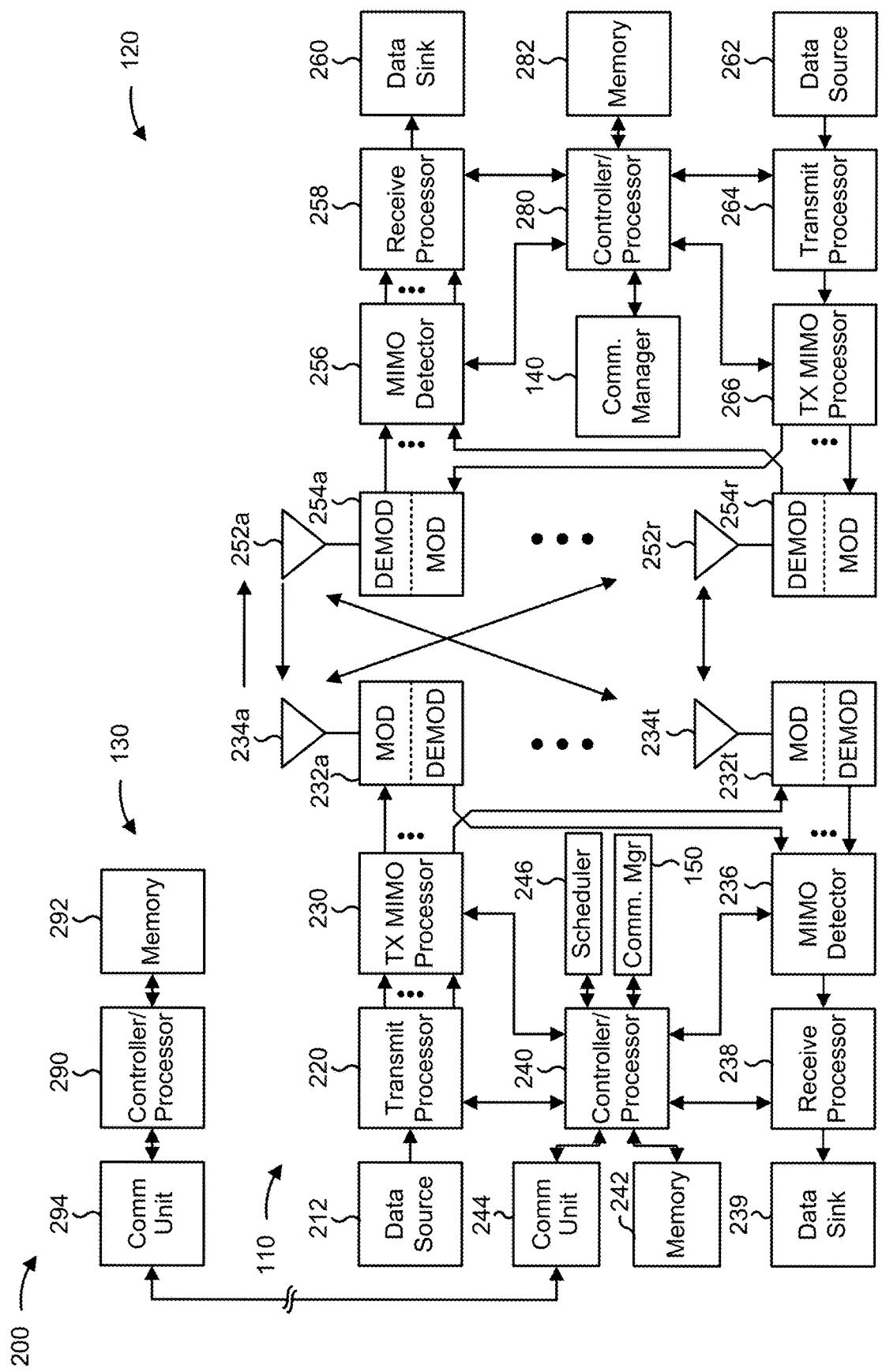
FIG. 2 is a diagram illustrating an example base station (BS) in communication with a user equipment (UE) in a wireless network in accordance with the present disclosure.

FIG. 2 is a diagram illustrating an example base station in communication with a UE in a wireless network in accordance with the present disclosure. The base station may correspond to base station 110 of FIG. 1. Similarly, the UE may correspond to UE 120 of FIG. 1.

Base station 110 may be equipped with T antennas 234a through 234t, and UE 120 may be equipped with R antennas 252a through 252r, where in general T≥1 and R≥1. At base station 110, a transmit processor 220 may receive data from a data source 212 for one or more UEs, select one or more modulation and coding schemes (MCSs) for each UE based at least in part on channel quality indicators (CQIs) received from the UE, process (for example, encode) the data for each UE based at least in part on the MCS(s) selected for the UE, and provide data symbols for all UEs. Transmit processor 220 may also process system information (for example, for semi-static resource partitioning information (SRPI) among other examples) and control information (for example, CQI requests, grants, or upper layer signaling) and provide overhead symbols and control symbols. Transmit processor 220 may also generate reference symbols for reference signals and synchronization signals. A transmit (TX) multiple-input multiple-output (MIMO) processor 230 may perform spatial processing (for example, precoding) on the data symbols, the control symbols, the overhead symbols, or the reference symbols, if applicable, and may provide T output symbol streams to T modulators (MODs) 232a through 232t. Each MOD 232 may process a respective output symbol stream (for example, for OFDM among other examples) to obtain an output sample stream. Each MOD 232 may further process (for example, convert to analog, amplify, filter, and upconvert) the output sample stream to obtain a downlink signal. T downlink signals from MODs 232a through 232t may be transmitted via T antennas 234a through 234t, respectively.

At UE 120, antennas 252a through 252r may receive the downlink signals from base station 110 or other base stations and may provide received signals to R demodulators (DEMODs) 254a through 254r, respectively. Each DEMOD 254 may condition (for example, filter, amplify, downconvert, and digitize) a received signal to obtain input samples. Each DEMOD 254 may further process the input samples (for example, for OFDM) to obtain received symbols. A MIMO detector 256 may obtain received symbols from all R DEMODs 254a through 254r, perform MIMO detection on the received symbols if applicable, and provide detected symbols. A receive processor 258 may process (for example, decode) the detected symbols, provide decoded data for UE 120 to a data sink 260, and provide decoded control information and system information to a controller/processor 280. The term "controller/processor" may refer to one or more controllers, one or more processors, or a combination of one or more controllers and one or more processors. A channel processor may determine one or more of a reference signal received power (RSRP) parameter, a received signal strength indicator (RSSI) parameter, a reference signal received quality (RSRQ) parameter, or a CQI parameter, among other examples. In some aspects, one or more components of UE 120 may be included in a housing.

Network controller 130 may include communication unit 294, controller/processor 290, and memory 292. Network controller 130 may include, for example, one or more devices in a core network. Network controller 130 may communicate with base station 110 via communication unit 294.

Antennas (such as antennas 234a through 234t or antennas 252a through 252r) may include, or may be included within, one or more antenna panels, antenna groups, sets of antenna elements, or antenna arrays, among other examples. An antenna panel, an antenna group, a set of antenna elements, or an antenna array may include one or more antenna elements. An antenna panel, an antenna group, a set of antenna elements, or an antenna array may include a set of coplanar antenna elements or a set of non-coplanar antenna elements. An antenna panel, an antenna group, a set of antenna elements, or an antenna array may include antenna elements within a single housing or antenna elements within multiple housings. An antenna panel, an antenna group, a set of antenna elements, or an antenna array may include one or more antenna elements coupled to one or more transmission or reception components, such as one or more components of FIG. 2.

On the uplink, at UE 120, a transmit processor 264 may receive and process data from a data source 262 as well as control information (for example, for reports including RSRP, RSSI, RSRQ, or CQI) from controller/processor 280. Transmit processor 264 may also generate reference symbols for one or more reference signals. The symbols from transmit processor 264 may be precoded by a TX MIMO processor 266 if applicable, further processed by MODs 254a through 254r (for example, for discrete Fourier transform spread orthogonal frequency division multiplexing (DFT-s-OFDM) or orthogonal frequency division multiplexing (OFDM) with a cyclic prefix (CP) (CP-OFDM)), and transmitted to base station 110. In some aspects, a modulator and a demodulator (for example, MOD/DEMOD 254) of the UE 120 may be included in a modem of the UE 120. In some aspects, the UE 120 includes a transceiver. The transceiver may include any combination of antenna(s) 252, modulators 254, demodulators 254, MIMO detector 256, receive processor 258, transmit processor 264, or TX MIMO processor 266. The transceiver may be used by a processor (for example, controller/processor 280) and memory 282 to perform aspects of any of the methods described herein.

At base station 110, the uplink signals from UE 120 and other UEs may be received by antennas 234, processed by DEMODs 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and uplink communications. In some aspects, a modulator and a demodulator (for example, MOD/DEMOD 232) of the base station 110 may be included in a modem of the base station 110. In some aspects, the base station 110 includes a transceiver. The transceiver may include any combination of antenna(s) 234, modulators 232, demodulators 232, MIMO detector 236, receive processor 238, transmit processor 220, or TX MIMO processor 230. The transceiver may be used by a processor (for example, controller/processor 240) and memory 242 to perform aspects of any of the methods described herein.

Controller/processor 240 of base station 110, controller/processor 280 of UE 120, or any other component(s) of FIG. 2 may perform one or more techniques associated with data-modulated DMRSs, as described in more detail elsewhere herein. For example, controller/processor 240 of base station 110, controller/processor 280 of UE 120, or any other component(s) of FIG. 2 may perform or direct operations of, for example, process 500 of FIG. 5, process 600 of FIG. 6, process 700 of FIG. 7, process 800 of FIG. 8, or other processes as described herein. Memories 242 and 282 may store data and program codes for base station 110 and UE 120, respectively. In some aspects, memory 242 or memory 282 may include a non-transitory computer-readable medium storing one or more instructions (for example, code or program code) for wireless communication. For example, the one or more instructions, when executed (for example, directly, or after compiling, converting, or interpreting) by one or more processors of the base station 110 or the UE 120, may cause the one or more processors, the UE 120, or the base station 110 to perform or direct operations of, for example, process 500 of FIG. 5, process 600 of FIG. 6, process 700 of FIG. 7, process 800 of FIG. 8, or other processes as described herein. In some aspects, executing instructions may include running the instructions, converting the instructions, compiling the instructions, or interpreting the instructions, among other examples.

In some aspects, the UE includes means for transmitting an indication of a capability of the UE to communicate one or more of uplink communications or downlink communications that include data-modulated DMRSs in which each of one or more resources of a plurality of resources of the uplink communications or the downlink communications carry both at least a portion of a DMRS sequence and data; or means for transmitting an uplink communication or receiving a downlink communication that includes the data-modulated DMRSs. The means for the UE to perform operations described herein may include, for example, one or more of communication manager 140, antenna 252, demodulator 254, MIMO detector 256, receive processor 258, transmit processor 264, TX MIMO processor 266, modulator 254, controller/processor 280, or memory 282.

In some aspects, the base station includes means for receiving an indication of a capability of a UE to communicate one or more of uplink communications or downlink communications that include data-modulated DMRSs in which each of one or more resources of a plurality of resources of the uplink communications or the downlink communications carry both at least a portion of a DMRS sequence and data; or means for transmitting a downlink communication to the UE or receiving an uplink communication from the UE that includes the data-modulated DMRSs. The means for the base station to perform operations described herein may include, for example, one or more of communication manager 150, transmit processor 220, TX MIMO processor 230, modulator 232, antenna 234, demodulator 232, MIMO detector 236, receive processor 238, controller/processor 240, memory 242, or scheduler 246.

In some aspects, the wireless communication device includes means for determining a size of a transport block based at least in part on resources, of a physical shared channel, that are allocated for data-modulated DMRSs (DM DMRSs) in which each of one or more resources of the resources carries both a DMRS and data; or means for transmitting a communication, via the physical shared channel, based at least in part on the size of the transport block that includes the DM DMRSs. In some aspects, the wireless communication device includes means for determining a size of a transport block that is based at least in part on resources, of a physical shared channel, that are allocated for DM DMRSs in which each of one or more resources of the resources carries both a DMRS and data; or means for receiving a communication, via the physical shared channel, based at least in part on the size of the transport block that includes the DM DMRSs. In some aspects, the means for the wireless communication device to perform operations described herein may include, for example, one or more of communication manager 150, transmit processor 220, TX MIMO processor 230, modulator 232, antenna 234, demodulator 232, MIMO detector 236, receive processor 238, controller/processor 240, memory 242, or scheduler 246. In some aspects, the means for the wireless communication device to perform operations described herein may include, for example, one or more of communication manager 140, antenna 252, demodulator 254, MIMO detector 256, receive processor 258, transmit processor 264, TX MIMO processor 266, modulator 254, controller/processor 280, or memory 282.

In some communication networks, a transmitting device may include DMRSs in a transmitted communication to improve channel estimation by a receiving device. In some scenarios (for example, in a high speed scenario or a high Doppler scenario), the transmitting device may transmit DMRSs on one symbol of the transmitted communication (for example, a baseline DMRS pattern) or on two or more symbols of the transmitted communication (for example, a baseline DMRS with additional DMRS pattern). However, a quantity of resources (for example, symbols or resource elements (REs)) that carry the DMRSs may increase overhead and reduce throughput of the communication.

In some aspects described herein, a transmitting wireless communication device (for example, a UE, a base station, or another device) may transmit a communication that includes a baseline DMRS with additional DMRSs patterns in which one or more of the DMRSs are data-modulated. For example, each one of one or more resources of a plurality of resources of a transmitted communication may carry both at least a portion of a DMRS sequence and data. In this way, the transmitting device may conserve computing, network, or communication resources by increasing throughput of the transmitted communication, which may reduce a quantity of communications to transmit buffered data, a quantity of resources used to transmit the communication, or provide other benefits.

To efficiently use the DM DMRSs, the transmitting wireless communication device may need to determine a transport block size for the communication. However, the transmitting wireless communication device determines the transport block size based at least in part on a quantity of resources of the communication after subtracting resources that are allocated to pilots (for example, DMRSs). In other words, transmitting wireless communication devices are configured to only count resources (for example, resource elements) that do not include DMRSs. This may cause the wireless communication device to use the DM DMRSs inefficiently by not accounting for a capacity for data on the DM DMRSs.

In some aspects described herein, a transmitting wireless communication device may determine a size of a transport block based at least in part on resources (for example, REs), of a physical shared channel, that are allocated for DM DMRSs (for example, in which each of one or more resources of the resources carries both a DMRS and data). In other words, the transmitting device may account for a capacity of the DM DMRSs when determining the size of the transport block (for example, a capacity to transmit bits of data). In this way, the transmitting wireless communication device may efficiently use the transport block to include additional data that the transmitting wireless communication device may transmit on the DM DMRSs.

Figure 3:
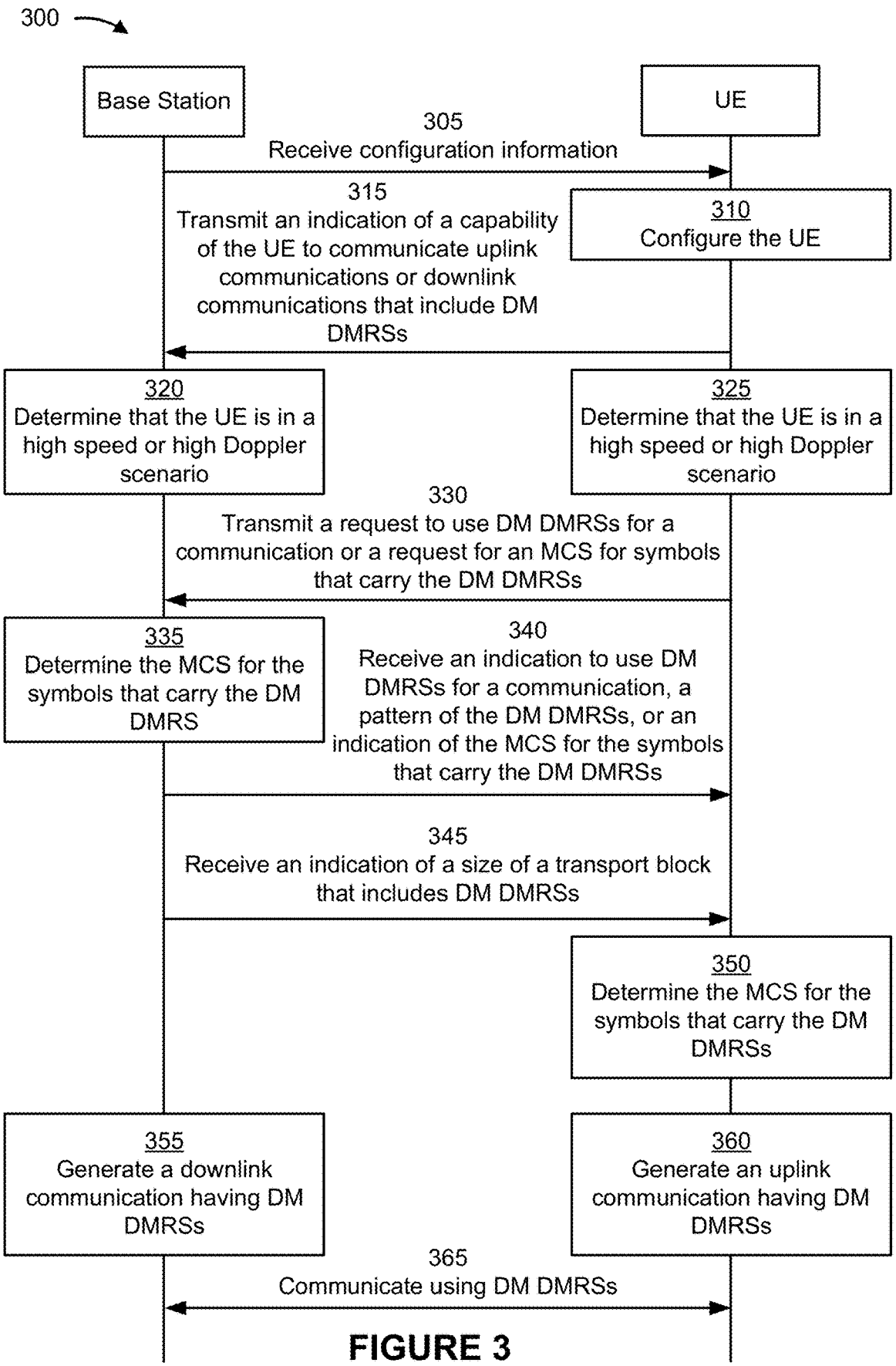

FIG. 3 is a diagram illustrating an example 300 associated with DM DMRSs, in accordance with the present disclosure. As shown in FIG. 3, a base station (for example, base station 110) may communicate with a UE (for example, UE 120). In some aspects, the base station and the UE may be part of a wireless network (for example, wireless network 100). As shown in FIG. 3, the UE and the base station may communicate uplink communications or downlink communications using DM DMRSs based at least in part on an indication that the UE supports DM DMRSs. Additionally or alternatively, a transmitting device (for example, the UE or the base station) may use a transport block size based at least in part on data carried on the DM DMRSs.

In a first operation 305, the base station may transmit, and the UE may receive, configuration information. In some aspects, the UE may receive configuration information from another device (for example, from another base station, another UE, or the like). In some aspects, the UE may receive the configuration information via one or more of radio resource control (RRC) signaling, medium access control (MAC) signaling (for example, MAC control elements (MAC CEs)), or the like. In some aspects, the configuration information may include an indication of one or more configuration parameters (for example, already known to the UE) for selection by the UE, explicit configuration information for the UE to use to configure the UE, or the like.

In some aspects, the configuration information may indicate that the UE is to transmit an indication of a capability of the UE to communicate uplink or downlink communications that include DM DMRSs. The configuration information may indicate that the UE is to use DM DMRSs when the UE is in a high speed or a high Doppler scenario. The configuration information may indicate that the UE is to transmit a request to use DM DMRSs or an MCS to use for the DM DMRSs. The configuration information may indicate a format for indicating the MCS (for example, an explicit indication or an indication relative to an MCS configured for data-only symbols of a communication). In some aspects, the configuration information may indicate that the UE is to use DM DMRSs based at least in part on transmitting the request or based at least in part on receiving an indication to use DM DMRSs for a communication. In some aspects, the configuration information may indicate that the UE is to determine a transport block size of a communication based at least in part on including data of the DM DMRSs.

In a second operation 310, the UE may configure itself for communicating with the base station. In some aspects, the UE may configure the UE based at least in part on the configuration information. In some aspects, the UE may be configured to perform one or more operations described herein.

In a third operation 315, the UE may transmit, and the base station may receive, an indication of a capability of the UE to communicate uplink communications or downlink communications that include DM DMRSs. The DM DMRSs may carry both DMRS sequences and data. In some aspects, the capability of the UE to communicate using DM DMRSs may be based at least in part on computing capabilities of the UE to estimate a channel using the DM DMRSs, demodulate a downlink communication, or decode a downlink communication within a configured amount of time (for example, to satisfy a latency requirement). In some aspects, the capability of the UE to communicate using DM DMRSs may be based at least in part on computing capabilities of the UE to generate an uplink communication having DM DMRSs within a configured amount of time (for example, to satisfy a latency requirement).

In a fourth operation 320, the base station may determine that the UE is in a high speed or high Doppler scenario. In some aspects, the base station may determine that the UE is in a high speed or a high Doppler scenario based at least in part on measuring signaling from the UE. In some aspects, the base station may determine that the UE is in a high speed or a high Doppler scenario based at least in part on an indication or a report from the UE that indicates that the UE is in a high speed or a high Doppler scenario.

In a fifth operation 325, the UE may determine that the UE is in a high speed or high Doppler scenario. In some aspects, the UE may determine that the UE is in a high speed or a high Doppler scenario based at least in part on measuring signaling from the base station. In some aspects, the UE may determine that the UE is in a high speed or a high Doppler scenario based at least in part on an indication or a report from the base station that indicates that the UE is in a high speed or a high Doppler scenario.

In a sixth operation 330, the UE may transmit, and the base station may receive, a request to use DM DMRSs for a communication or a request for an MCS for symbols that carry the DM DMRSs. For example, the UE may transmit a request to transmit one or more uplink communications or to receive one or more downlink communications with the DM DMRSs.

In some aspects, the UE may transmit the request to use DM DMRSs for the communication or the request for the MCS via downlink control information (DCI), RRC signaling, or one or more MAC CEs. In some aspects, the UE may transmit the request for the MCS along with the request for the UE use DM DMRSs for the communication.

In some aspects, the request for the MCS may include an explicit indication of a requested MCS for the symbols that carry the DM DMRSs. In some aspects, the request for the MCS may include an implicit indication of a requested MCS for the symbols that carry the DM DMRSs. For example, the implicit indication may indicate an MCS relative to an MCS for symbols allocated for data (for example, data-only symbols).

In a seventh operation 335, the base station may determine the MCS for the symbols that carry the DM DMRSs. In some aspects, the base station may determine the MCS for the symbols that carry the DM DMRS based at least in part on a pattern of DMRSs, a quantity of additional DMRSs (for example, in addition to a baseline DMRS having on only one symbol), a speed of the UE, an expected Doppler effect (expected based at least in part on, for example, a measurement of uplink signals or a report from the UE) on the communication to have the DM DMRSs, or capabilities of the UE to estimate a channel with DM DMRSs, among other examples.

In an eighth operation 340, the UE may receive, and the base station may transmit, an indication to use DM DMRSs for a communication, a pattern of the DM DMRSs, or an indication of the MCS for the symbols that carry the DMRSs. In some aspects, the UE may receive the indication to use DM DMRSs for the communication, the pattern of the DM DMRSs, or the indication of the MCS for the symbols that carry the DMRSs within a single communication or via multiple communications. For example, the UE may receive the indication to use DM DMRSs for the communication, the indication of the pattern of the DM DMRSs, or the indication of the MCS for the symbols that carry the DMRSs via one or more DCI communications, one or more RRC communications, or one or more MAC CEs, among other examples.

In some aspects, the indication to use DM DMRSs may be based at least in part on, or in the absence of, the base station receiving the request described in connection with operation 330. The indication to use DM DMRSs may indicate a duration to use DM DMRSs (for example, a quantity of communications or an amount of time, among other examples). The indication to use DM DMRSs may indicate whether the UE is to use DM DMRSs for uplink communications, for downlink communications (for example to receive downlink communications having DM DMRSs), or both.

In some aspects, the indication of the pattern of the DM DMRSs may indicate a DMRS pattern and an indication of DMRS symbols of the DMRS pattern that are to carry DM DMRSs. The indication of the pattern of the DM DMRSs may indicate a DM DMRS pattern for an uplink communication or a downlink communication. In some aspects, the indication of the pattern of the DM DMRSs may indicate that one or more symbols of the DMRS pattern (for example, a baseline DMRS symbol) do not have DM DMRSs, and one or more other symbols of the DMRS pattern have DM DMRSs. In some aspects, the symbols of the DMRS pattern that have DM DMRSs may be consecutive DMRS symbols (for example, a quantity of latest DMRS symbols), may alternate with DMRS symbols without DM DMRSs (for example, to improve a channel estimation using only the DMRS symbols without DM DMRSs), may be located in configured in DMRS symbols based at least in part on scheduling considerations, among other examples.

The MCS for the symbols that carry the DM DMRSs may be different than an MCS for data symbols (for example, symbols allocated to carry data and not DMRSs). In some aspects, the indication of the MCS for the symbols that carry the DM DMRSs may include an explicit indication of the MCS or may include an implicit indication of the MCS based at least in part on an indication relative to an MCS used for data symbols. The indication relative to an MCS used for data symbols may include a difference between the MCS for symbols that carry the DM DMRSs and an MCS for symbols that carry other data. For example, the indication of the MCS may indicate to use an MCS that is two levels of MCS (for example, using levels configured by the base station or indicated in a communication protocol) less than an MCS used for data symbols.

In some aspects, the MCS for the symbols that carry the DM DMRSs may be based at least in part on feedback signaling associated with an uplink communication previously transmitted by the UE or a downlink communication previously received by the UE that includes DM DMRSs. For example, if a previous communication that includes DM DMRSs is not received or not decoded, the base station may indicate an MCS that is lower than an MCS that was used for DM DMRSs of the previous communication.

In a ninth operation 345, the UE may receive, and the base station may transmit, an indication of a size of a transport block that includes DM DMRSs (for example, resources allocated for DM DMRSs). The size of the transport block may be based at least in part on resources, of a physical shared channel, that are allocated for DM DMRSs. The base station may further determine a size of a resource allocation based at least in part on the size of the transport block. The size of the transport block may be based at least in part on a capacity for data on the resources that are allocated for the DM DMRSs, and a capacity for data on additional resources, of the physical shared channel, that are allocated for data.

The capacity for the data on the resources that are allocated for DM DMRSs may be based at least in part on a quantity of the resources that are allocated for the DM DMRSs, a configured overhead for the DMRSs, a rule (for example, in a communication protocol) for determining capacities for data on resources allocated for DM DMRSs, an MCS for the resources that are allocated for the DM DMRSs, or a quantity of layers of the communication to have DM DMRS.

In some aspects, the communication having DM DMRSs may be associated with a low-density parity-check (LDPC) base graph based at least in part on the size of the transport block. The LDPC base graph may be based at least in part on an effective code rate. The effective code rate may be based at least in part on a total quantity of bits to be transmitted via the transport block, a quantity of resources that are allocated for the DM DMRSs, a modulation order of the resources that are allocated for the DM DMRSs, a quantity of additional resources that are allocated for data, a modulation order of the additional resources that are allocated for the data, or a quantity of layers of the communication, among other examples.

In a tenth operation 350, the UE may determine the MCS for the symbols that carry the DM DMRSs. In some aspects, the UE may determine the MCS for the symbols that carry the DM DMRSs based at least in part on a configured MCS for the DM DMRSs, or a configured difference of the MCS for the DM DMRSs and an MCS for other data of the communication. In some aspects, the UE may determine the MCS for the symbols that carry the DM DMRSs based at least in part on signaling from the base station.

In an eleventh operation 355, the base station may generate a downlink communication having DM DMRSs. For example, the base station may generate the downlink communication having DM DMRSs when the base station is a transmitting wireless communication device for the communication having DM DMRSs. In some aspects, the base station may generate the downlink communication having DM DMRSs based at least in part on a determination that the UE is in a high speed scenario or a high Doppler scenario. In some aspects, the base station may generate the downlink communication having DM DMRSs and having at least one DMRS that is not data-modulated (for example, having only a DMRS sequence without data).

In some aspects, generating the downlink communication having DM DMRSs includes applying a constellation to the DM DMRSs, with the constellation based at least in part on outermost constellation points of other data (for example, carried on data-only symbols) of the downlink communication. In some aspects, the base station may apply scaling to the outermost constellation points to normalize an average energy for resources of the downlink communication.

In some aspects, the base station may scramble the DM DMRSs separately from other data of the downlink communication. In some aspects, the base station may apply an orthogonal cover code (OCC) to the DM DMRSs. In this way, the DM DMRSs may be decoded separately from the other data of the downlink communication. This may enable the UE to use the DM DMRSs for refining a channel estimate that is based at least in part on DMRSs without data modulation before demodulating data on data-only symbols. Additionally or alternatively, the UE may transmit decoding feedback associated with the data of the DM DMRSs separately from the data on the data-only symbols.

In a twelfth operation 360, the UE may generate an uplink communication having DM DMRSs. For example, the UE may generate the uplink communication having DM DMRSs when the UE is a transmitting wireless communication device for the communication having DM DMRSs. In some aspects, the UE may generate the uplink communication having DM DMRSs based at least in part on a determination that the UE is in a high speed scenario or a high Doppler scenario. In some aspects, the UE may generate the uplink communication having DM DMRSs and having at least one DMRS that is not data-modulated (for example, having only a DMRS sequence without data).

In some aspects, generating the uplink communication having DM DMRSs includes applying a constellation to the DM DMRSs, with the constellation based at least in part on outermost constellation points of other data (for example, carried on data-only symbols) of the uplink communication. In some aspects, the UE may apply scaling to the outermost constellation points to normalize an average energy for resources of the uplink communication.

In some aspects, the UE may scramble the DM DMRSs separately from other data of the uplink communication. In some aspects, the UE may apply an OCC to the DM DMRSs. In this way, the DM DMRSs may be decoded separately from the other data of the uplink communication. This may enable the UE to use the DM DMRSs for refining a channel estimate that is based at least in part on DMRSs without data modulation before demodulating data on data-only symbols. Additionally or alternatively, the UE may transmit decoding feedback associated with the data of the DM DMRSs separately from the data on the data-only symbols.

In a thirteenth operation 365, the UE and the base station may communicate using DM DMRSs. In some aspects, a transmitting wireless communication device (for example, the base station or the UE) may transmit the communication generated as described in connection with operation 355 or operation 360.

A receiving wireless communication device (for example, the UE or the base station) may receive the downlink communication or the uplink communication having the DM DMRSs.

In some aspects, the receiving wireless communication device may receive the communication based at least in part on a multi-operation reception. For example, the receiving device may receive the communication based at least in part on performing iterative channel estimation, demodulating, and decoding of the communication. The receiving wireless communication device may perform a first stage channel estimation for the communication based at least in part on one or more DMRSs of the communication that are not data-modulated. The receiving wireless communication device may perform slicing or hard decision decoding of the DM DMRSs based at least in part on the first stage channel estimation. The receiving wireless communication device may perform a second stage channel estimation for the communication based at least in part on the DM DMRSs and the one or more DMRSs of the communication that are not data-modulated. The receiving wireless communication device may then decode the communication (for example, including the data-only symbols) based at least in part on the second stage channel estimation.

In some aspects, the communication includes a multi-layered communication. In some aspects, transmitting the uplink communication or receiving the downlink communication may include transmitting the uplink communication or receiving the downlink communication including the DM DMRSs on only one layer of the multi-layered communication, on a subset of layers of the multi-layered communication, or on all layers of the multi-layered communication. In some aspects, a quantity of the layers to include the DM DMRSs is based at least in part on capabilities of the UE to transmit or to receive the DM DMRSs on multiple layers, a correlation between the layers, or an expected interference between the layers for the DM DMRS symbols.

The receiving wireless communication device may descramble the DM DMRSs separately from other data of the communication. The receiving wireless communication device may attempt to decode the DM DMRSs based at least in part on the OCC being applied to the DM DMRSs.

Based at least in part on a transmitting wireless communication device (for example, a UE, a base station, or another device) transmitting a communication that includes one or more of the DMRSs are data-modulated based at least in part on an indicated capability of the UE, the transmitting device and the receiving device may conserve computing, network, or communication resources by increasing throughput of the transmitted communication, which may reduce a quantity of communications to transmit buffered data, a quantity of resources used to transmit the communication, or provide other benefits. Based at least in part on determining a size of a transport block to include resources (for example, REs), of a physical shared channel, that are allocated for DM DMRSs the transmitting wireless communication device and the receiving wireless communication device may efficiently use the transport block to include additional data that the transmitting wireless communication device transmits on the DM DMRSs.

FIG. 4 is a diagram illustrating an example 400 associated with data-modulated demodulation reference signals, in accordance with the present disclosure. As shown in FIG. 4, a base station (for example, base station 110) may communicate with a UE (for example, UE 120). In some aspects, the base station and the UE may be part of a wireless network (for example, wireless network 100). As shown in FIG. 4, the UE and the base station may communicate uplink communications or downlink communications using DM DMRSs based at least in part on an indication that the UE supports DM DMRSs. Additionally or alternatively, a transmitting device (for example, the UE or the base station) may use a transport block size based at least in part on data carried on the DM DMRSs.

As shown in FIG. 4, example DMRS patterns 410 and 420 include control channel resources, data-allocated shared channel resources, baseline DMRS resources, phase tracking reference signal resources, and DM DMRS resources. Example DMRS pattern 410 shows a DMRS pattern having 4 symbols allocated for DMRSs at symbols 2, 5, 8, and 11. Of the DMRS symbols, a baseline DMRS symbol at symbol 2 does not include DM DMRSs. The remaining 3 DMRS symbols include DM DMRSs.

Example DMRS pattern 420 shows a DMRS pattern having 3 symbols allocated for DMRSs at symbols 2, 7, and 11. Similar to example DMRS pattern 410, a baseline DMRS symbol at symbol 2 does not include DM DMRSs. The remaining 2 DMRS symbols include DM DMRSs.

Figure 5:
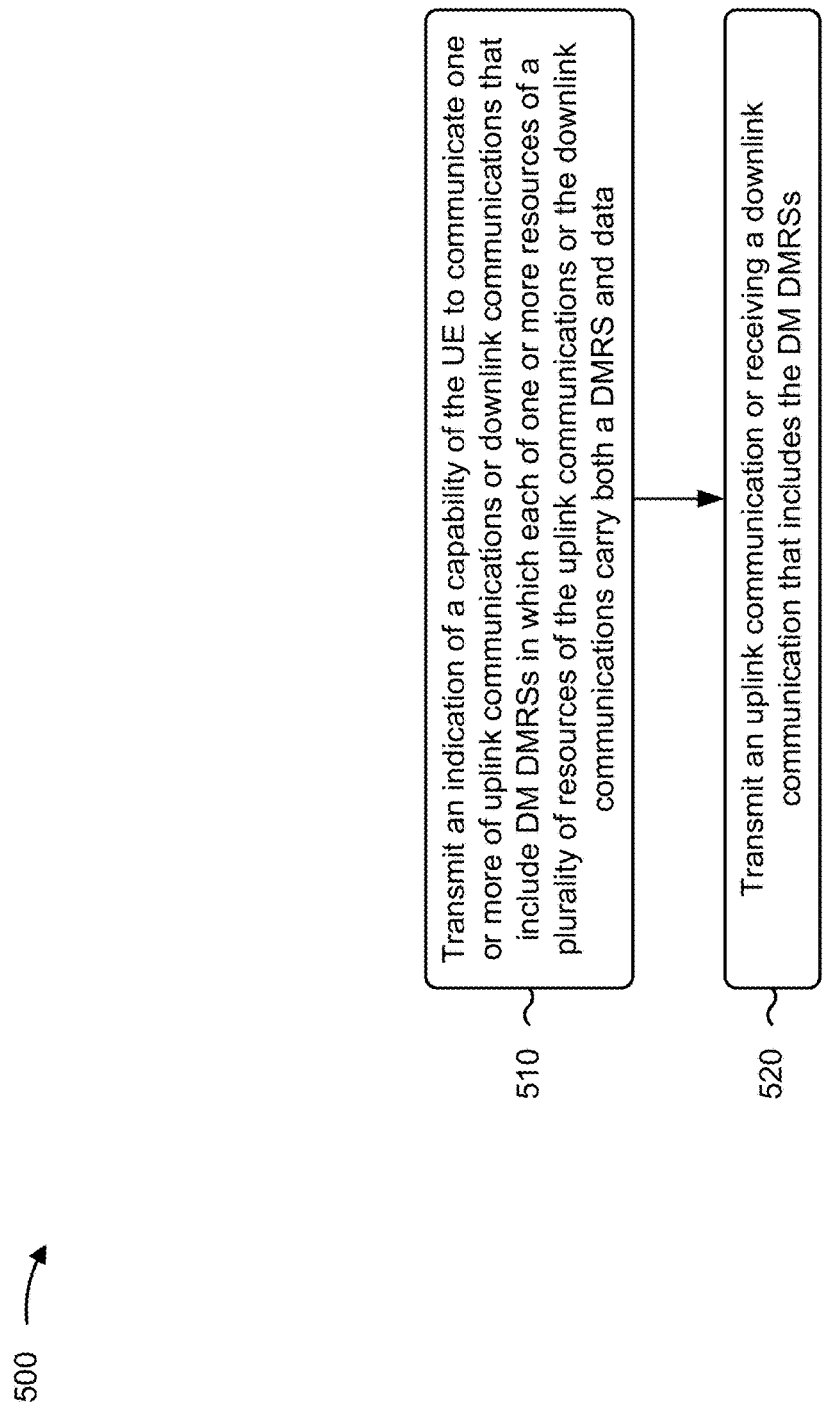
FIG. 5 is a flowchart illustrating an example process performed, for example, by a UE in accordance with the present disclosure.

FIG. 5 is a flowchart illustrating an example process 500 performed, for example, by a UE in accordance with the present disclosure. Example process 500 is an example where the UE (for example, UE 120) performs operations associated with DM DMRSs.

As shown in FIG. 5, in some aspects, process 500 may include transmitting an indication of a capability of the UE to communicate one or more of uplink communications or downlink communications that include DM DMRSs in which each of one or more resources of a plurality of resources of the uplink communications or the downlink communications carry both at least a portion of a DMRS sequence and data (block 510). For example, the UE (such as by using communication manager 140 or transmission component 904, depicted in FIG. 9) may transmit an indication of a capability of the UE to communicate one or more of uplink communications or downlink communications that include DM DMRSs in which each of one or more resources of a plurality of resources of the uplink communications or the downlink communications carry both at least a portion of a DMRS sequence and data, as described above.

As further shown in FIG. 5, in some aspects, process 500 may include transmitting an uplink communication or receiving a downlink communication that includes the DM DMRSs (block 520). For example, the UE (such as by using communication manager 140 or transmission component 904, depicted in FIG. 9) may transmit an uplink communication or receiving a downlink communication that includes the DM DMRSs, as described above.

Process 500 may include additional aspects, such as any single aspect or any combination of aspects described below or in connection with one or more other processes described elsewhere herein.

In a first additional aspect, process 500 includes transmitting a request to transmit the uplink communication or to receive the downlink communication with the DM DMRSs.

In a second additional aspect, alone or in combination with the first aspect, process 500 includes determining that the UE is in a high speed scenario or a high Doppler scenario, wherein transmitting the uplink communication or receiving the downlink communication is based at least in part on determining that the UE is in a high speed scenario or a high Doppler scenario.

In a third additional aspect, alone or in combination with one or more of the first and second aspects, process 500 includes receiving an indication of a pattern of the DM DMRSs for the uplink communication or the downlink communication.

In a fourth additional aspect, alone or in combination with one or more of the first through third aspects, receiving the indication of the pattern of the DM DMRSs comprises receiving the indication of the pattern of the DM DMRSs via DCI, RRC signaling, or one or more MAC CEs.

In a fifth additional aspect, alone or in combination with one or more of the first through fourth aspects, the uplink communication or the downlink communication further includes at least one DMRS that is not data-modulated.

In a sixth additional aspect, alone or in combination with one or more of the first through fifth aspects, process 500 includes transmitting a request for an MCS for symbols that carry the DM DMRSs.

In a seventh additional aspect, alone or in combination with one or more of the first through sixth aspects, transmitting the request for the MCS comprises transmitting the request for the MCS with a request for the UE to transmit the uplink communication or to receive the downlink communication with the DM DMRSs.

In an eighth additional aspect, alone or in combination with one or more of the first through seventh aspects, process 500 includes receiving an indication of a MCS for symbols that carry the DM DMRSs, wherein the MCS for the symbols that carry the DM DMRSs is different than an MCS for data symbols.

In a ninth additional aspect, alone or in combination with one or more of the first through eighth aspects, the indication of the MCS is based at least in part on feedback signaling associated with an uplink communication previously transmitted by the UE or a downlink communication previously received by the UE that includes the DM DMRSs.

In a tenth additional aspect, alone or in combination with one or more of the first through ninth aspects, receiving the indication of the MCS comprises receiving the indication of the MCS via DCI, RRC signaling, or one or more MAC CEs.

In an eleventh additional aspect, alone or in combination with one or more of the first through tenth aspects, the indication of the MCS indicates a difference between the MCS for symbols that carry the DM DMRSs and an MCS for symbols that carry other data of the uplink communication or the downlink communication.

In a twelfth additional aspect, alone or in combination with one or more of the first through eleventh aspects, process 500 includes determining a MCS for transmitting the uplink communication or for receiving the downlink communication that includes the DM DMRSs based at least in part on a configured MCS for the DM DMRSs, or a configured difference of an MCS for the DM DMRSs and an MCS for other data of the uplink communication or the downlink communication.

In a thirteenth additional aspect, alone or in combination with one or more of the first through twelfth aspects, a constellation of the DM DMRSs is based at least in part on outermost constellation points of other data of the uplink communication or the downlink communication.

In a fourteenth additional aspect, alone or in combination with one or more of the first through thirteenth aspects, process 500 includes applying scaling to the outermost constellation points to normalize an average energy for resources of the uplink communication or the downlink communication.

In a fifteenth additional aspect, alone or in combination with one or more of the first through fourteenth aspects, transmitting the uplink communication includes scrambling the DM DMRSs separately from other data of the uplink communication, or wherein receiving the downlink communication includes descrambling the DM DMRSs separately from other data of the uplink communication.

In a sixteenth additional aspect, alone or in combination with one or more of the first through fifteenth aspects, transmitting the uplink communication includes applying an OCC to the DM DMRSs, or wherein the downlink communication includes the DM DMRSs having an applied OCC.

In a seventeenth additional aspect, alone or in combination with one or more of the first through sixteenth aspects, the uplink communication or the downlink communication includes a multi-layered communication, wherein transmitting the uplink communication or receiving the downlink communication includes transmitting the uplink communication or receiving the downlink communication including the DM DMRSs on only one layer of the multi-layered communication, wherein transmitting the uplink communication or receiving the downlink communication includes transmitting the uplink communication or receiving the downlink communication including the DM DMRSs on a subset of layers of the multi-layered communication, or wherein transmitting the uplink communication or receiving the downlink communication includes transmitting the uplink communication or receiving the downlink communication including the DM DMRSs on all layers of the multi-layered communication.

In an eighteenth additional aspect, alone or in combination with one or more of the first through seventeenth aspects, transmitting the uplink communication or receiving the downlink communication includes receiving the downlink communication, and wherein receiving the downlink communication includes one or more of performing a first stage channel estimation for the downlink communication based at least in part on one or more DMRSs of the downlink communication that are not data-modulated, performing one or more of slicing or hard decision decoding of the DM DMRSs, performing second stage channel estimation for the downlink communication based at least in part on the DM DMRSs and the one or more DMRSs of the downlink communication that are not data-modulated, or decoding the downlink communication based at least in part on the second stage channel estimation.

In a nineteenth additional aspect, alone or in combination with one or more of the first through eighteenth aspects, transmitting the uplink communication or receiving the downlink communication includes receiving the downlink communication, and wherein receiving the downlink communication includes performing iterative channel estimation, demodulating, and decoding of the downlink communication.

Although FIG. 5 shows example blocks of process 500, in some aspects, process 500 may include additional blocks, fewer blocks, different blocks, or differently arranged blocks than those depicted in FIG. 5. Additionally or alternatively, two or more of the blocks of process 500 may be performed in parallel.

Figure 6:
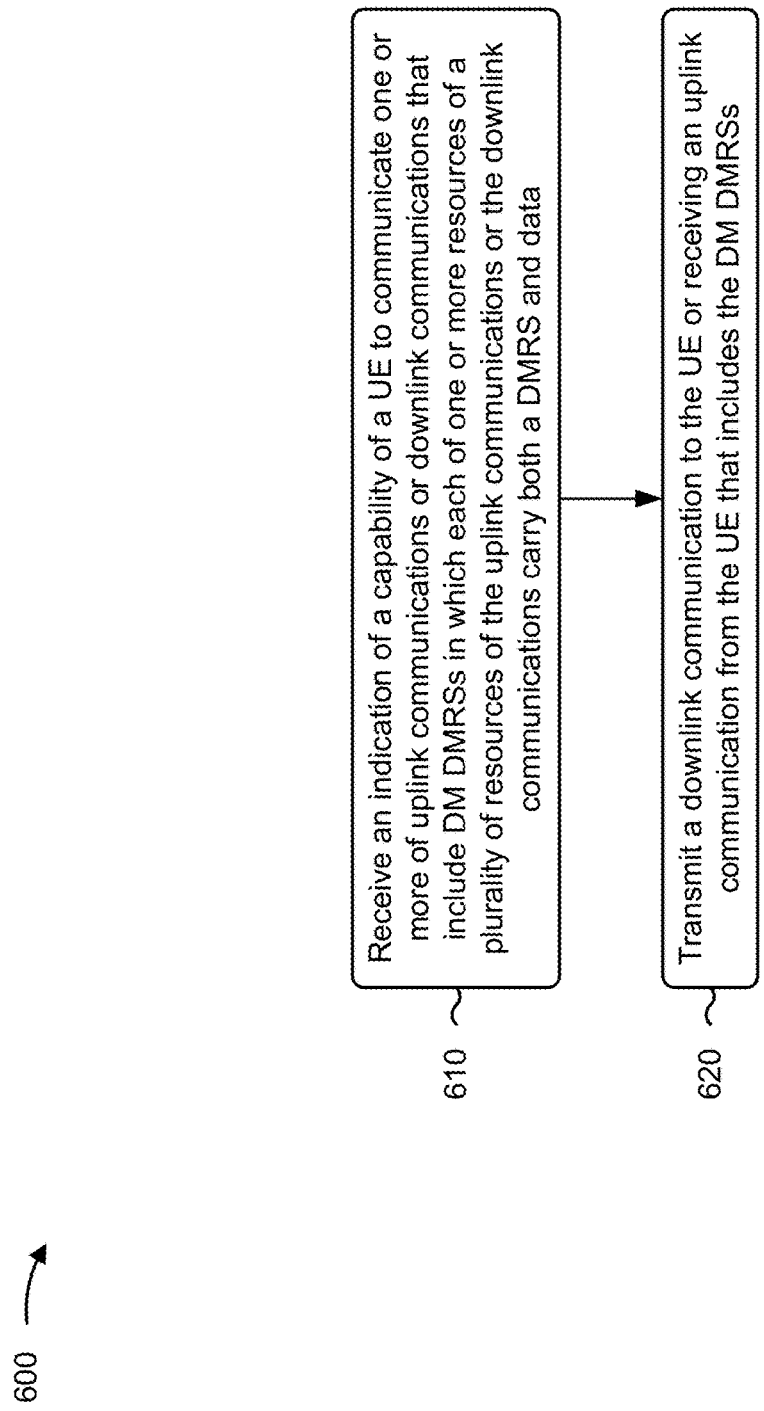
FIG. 6 is a flowchart illustrating an example process performed, for example, by a base station in accordance with the present disclosure.

FIG. 6 is a flowchart illustrating an example process 600 performed, for example, by a base station in accordance with the present disclosure. Example process 600 is an example where the base station (for example, base station 110) performs operations associated with DM DMRSs.

As shown in FIG. 6, in some aspects, process 600 may include receiving an indication of a capability of a UE to communicate one or more of uplink communications or downlink communications that include DM DMRSs in which each of one or more resources of a plurality of resources of the uplink communications or the downlink communications carry both at least a portion of a DMRS sequence and data (block 610). For example, the base station (such as by using communication manager 150 or reception component 1002, depicted in FIG. 10) may receive an indication of a capability of a UE to communicate one or more of uplink communications or downlink communications that include DM DMRSs in which each of one or more resources of a plurality of resources of the uplink communications or the downlink communications carry both at least a portion of a DMRS sequence and data, as described above.

As further shown in FIG. 6, in some aspects, process 600 may include transmitting a downlink communication to the UE or receiving an uplink communication from the UE that includes the DM DMRSs (block 620). For example, the base station (such as by using communication manager 150 or transmission component 1004, depicted in FIG. 10) may transmit a downlink communication to the UE or receiving an uplink communication from the UE that includes the DM DMRSs, as described above.

Process 600 may include additional aspects, such as any single aspect or any combination of aspects described below or in connection with one or more other processes described elsewhere herein.

In a first additional aspect, process 600 includes receiving, from the UE, a request to transmit the downlink communication or to receive the uplink communication with the DM DMRSs.

In a second additional aspect, alone or in combination with the first aspect, process 600 includes determining that the UE is in a high speed scenario or a high Doppler scenario, wherein transmitting the uplink communication or receiving the downlink communication is based at least in part on determining that the UE is in a high speed scenario or a high Doppler scenario.

In a third additional aspect, alone or in combination with one or more of the first and second aspects, process 600 includes transmitting an indication of a pattern of the DM DMRSs for the uplink communication or the downlink communication.

In a fourth additional aspect, alone or in combination with one or more of the first through third aspects, transmitting the indication of the pattern of the DM DMRSs comprises transmitting the indication of the pattern of the DM DMRSs via DCI, RRC signaling, or one or more MAC CEs.

In a fifth additional aspect, alone or in combination with one or more of the first through fourth aspects, process 600 includes transmitting the downlink communication or receiving the uplink communication with at least one DMRS that is not data-modulated.

In a sixth additional aspect, alone or in combination with one or more of the first through fifth aspects, process 600 includes receiving a request for a MCS for symbols that carry the DM DMRS.

In a seventh additional aspect, alone or in combination with one or more of the first through sixth aspects, receiving the request for the MCS comprises receiving the request for the MCS with a request for the base station to receive the uplink communication or to transmit the downlink communication with the DM DMRSs.

In an eighth additional aspect, alone or in combination with one or more of the first through seventh aspects, process 600 includes transmitting an indication of a MCS for symbols that carry the DM DMRSs.

In a ninth additional aspect, alone or in combination with one or more of the first through eighth aspects, the indication of the MCS is based at least in part on feedback signaling associated with an uplink communication previously received by the base station or a downlink communication previously transmitted by the base station that includes the DM DMRSs.

In a tenth additional aspect, alone or in combination with one or more of the first through ninth aspects, transmitting the indication of the MCS comprises transmitting the indication of the MCS via DCI, RRC signaling, or one or more MAC CEs.

In an eleventh additional aspect, alone or in combination with one or more of the first through tenth aspects, the indication of the MCS indicates a difference between the MCS for symbols that carry the DM DMRSs and an MCS for symbols that carry other data of the uplink communication or the downlink communication.

In a twelfth additional aspect, alone or in combination with one or more of the first through eleventh aspects, process 600 includes determining a MCS for communicating the uplink communication or the downlink communication having the DM DMRSs based at least in part on one or more of a configured MCS for the DM DMRSs, or a configured difference of an MCS for the DM DMRSs and an MCS for other data of the uplink communication or the downlink communication.

In a thirteenth additional aspect, alone or in combination with one or more of the first through twelfth aspects, a constellation of the DM DMRSs is based at least in part on outermost constellation points of other data of the uplink communication or the downlink communication.

In a fourteenth additional aspect, alone or in combination with one or more of the first through thirteenth aspects, process 600 includes applying scaling to the outermost constellation points to normalize average energy for resources of the uplink communication or the downlink communication.

In a fifteenth additional aspect, alone or in combination with one or more of the first through fourteenth aspects, transmitting the downlink communication includes scrambling the DM DMRSs separately from other data of the downlink communication, or wherein receiving the uplink communication includes descrambling the DM DMRSs separately from other data of the downlink communication.

In a sixteenth additional aspect, alone or in combination with one or more of the first through fifteenth aspects, transmitting the downlink communication includes applying an OCC to the DM DMRSs, or wherein the uplink communication includes the DM DMRSs having an applied OCC.

In a seventeenth additional aspect, alone or in combination with one or more of the first through sixteenth aspects, the uplink communication or the downlink communication includes a multi-layered communication, and wherein transmitting the downlink communication or receiving the uplink communication includes transmitting the downlink communication or receiving the uplink communication including the DM DMRSs on only one layer of the multi-layered communication, wherein transmitting the downlink communication or receiving the uplink communication includes transmitting the downlink communication or receiving the uplink communication including the DM DMRSs on a subset of layers of the multi-layered communication, or wherein transmitting the downlink communication or receiving the uplink communication includes transmitting the downlink communication or receiving the uplink communication including the DM DMRSs on all layers of the multi-layered communication.

In an eighteenth additional aspect, alone or in combination with one or more of the first through seventeenth aspects, transmitting the uplink communication or receiving the downlink communication includes receiving an uplink communication, and wherein receiving the uplink communication includes one or more of performing a first stage channel estimation for the uplink communication based at least in part on one or more DMRSs of the uplink communication that are not data-modulated, performing one or more of slicing or hard decision decoding of the DM DMRSs, performing second stage channel estimation for the uplink communication based at least in part on DM DMRSs and the one or more DMRSs of the uplink communication that are not data-modulated, or decoding the uplink communication based at least in part on the second stage channel estimation.

In a nineteenth additional aspect, alone or in combination with one or more of the first through eighteenth aspects, transmitting the downlink communication or receiving the uplink communication includes receiving the uplink communication, and wherein receiving the uplink communication includes performing iterative channel estimation, demodulating, and decoding of the uplink communication.

Although FIG. 6 shows example blocks of process 600, in some aspects, process 600 may include additional blocks, fewer blocks, different blocks, or differently arranged blocks than those depicted in FIG. 6. Additionally or alternatively, two or more of the blocks of process 600 may be performed in parallel.

Figure 7:
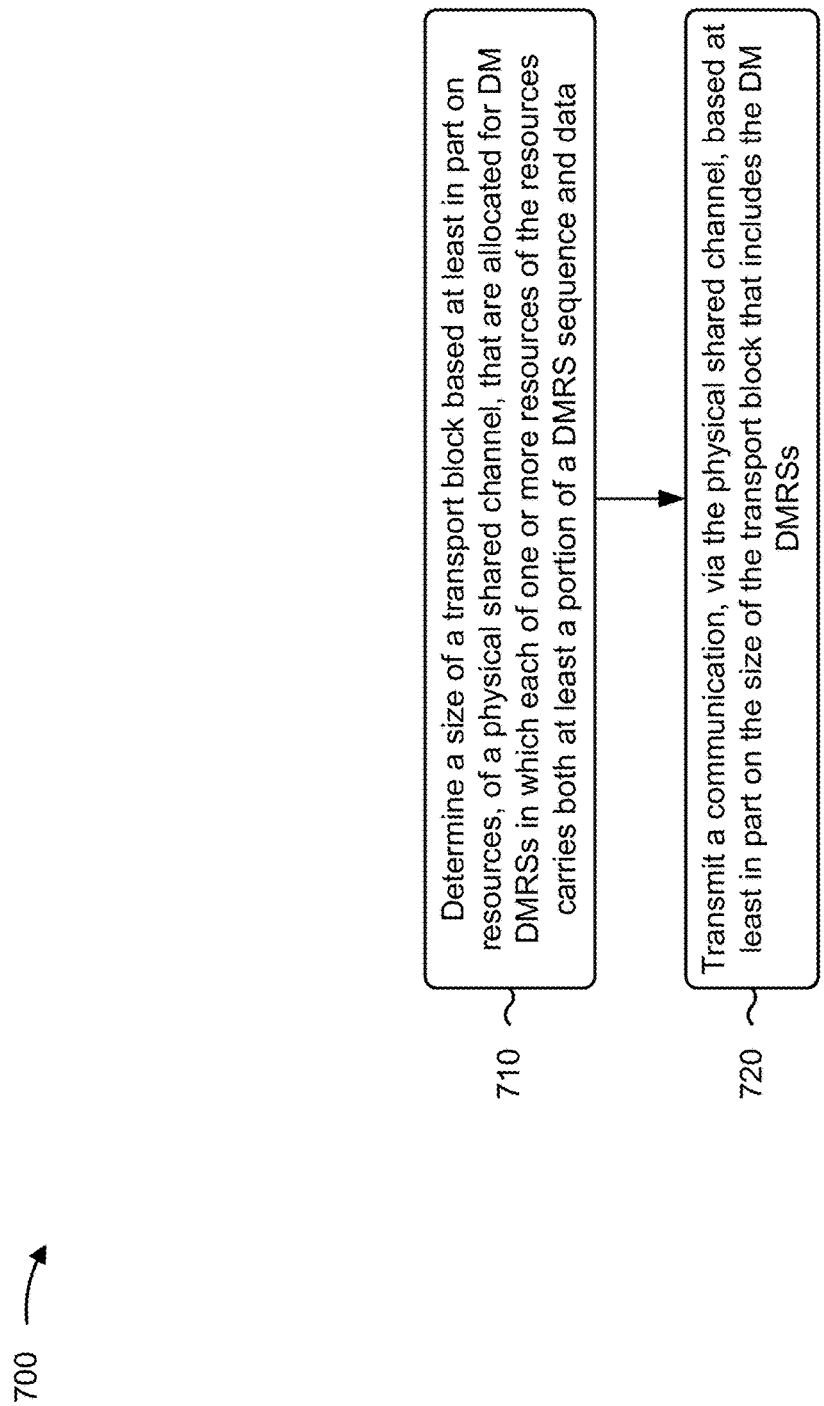
FIGS. 7 and 8 are flowcharts illustrating example processes performed, for example, by a wireless communication device in accordance with the present disclosure.

FIG. 7 is a flowchart illustrating an example process 700 performed, for example, by a wireless communication device in accordance with the present disclosure. Example process 700 is an example where the wireless communication device (for example, UE 120 or base station 110) performs operations associated with DM DMRSs.

As shown in FIG. 7, in some aspects, process 700 may include determining a size of a transport block based at least in part on resources, of a physical shared channel, that are allocated for DM DMRSs in which each of one or more resources of the resources carries both a DMRS and data (block 710). For example, the wireless communication device (such as by using communication manager 140 or 150, or communication manager 908 or 1008 depicted in FIGS. 9 and 10) may determine a size of a transport block based at least in part on resources, of a physical shared channel, that are allocated for DM DMRSs in which each of one or more resources of the resources carries both a DMRS and data, as described above.

As further shown in FIG. 7, in some aspects, process 700 may include transmitting a communication, via the physical shared channel, based at least in part on the size of the transport block that includes the DM DMRSs (block 720). For example, the wireless communication device (such as by using communication manager 140 or 150 or transmission component 1004, depicted in FIG. 10) may transmit a communication, via the physical shared channel, based at least in part on the size of the transport block that includes the DM DMRSs, as described above.

Process 700 may include additional aspects, such as any single aspect or any combination of aspects described below or in connection with one or more other processes described elsewhere herein.

In a first additional aspect, process 700 includes determining a size of a resource allocation for transmitting the communication based at least in part on the size of the transport block.

In a second additional aspect, alone or in combination with the first aspect, process 700 includes transmitting, to a receiving device, an indication of the size of the transport block that is based at least in part on resources, of a physical shared channel, that are allocated for DM DMRSs in which each of one or more resources of the resources carries both a DMRS and data.

In a third additional aspect, alone or in combination with one or more of the first and second aspects, determining the size of the transport block comprises determining a capacity for data on the resources, of the physical shared channel, that are allocated for the DM DMRSs, and determining a capacity for data on additional resources, of the physical shared channel, that are allocated for data.

In a fourth additional aspect, alone or in combination with one or more of the first through third aspects, the capacity for the data on the resources, of the physical shared channel, that are allocated for the DM DMRSs, is based at least in part on one or more of a quantity of the resources, of the physical shared channel, that are allocated for the DM DMRSs, a configured overhead for the DMRSs, a rule for determining capacities for data on resources allocated for DM DMRSs, a MCS for the resources, of the physical shared channel, that are allocated for the DM DMRSs, or a quantity of layers of the communication.

In a fifth additional aspect, alone or in combination with one or more of the first through fourth aspects, process 700 includes determining an LDPC base graph based at least in part on the size of the transport block.

In a sixth additional aspect, alone or in combination with one or more of the first through fifth aspects, process 700 includes determining an LDPC base graph based at least in part on an effective code rate, wherein the effective code rate is based at least in part on one or more of a total quantity of bits to be transmitted via the transport block, a quantity of resources, of the physical shared channel, that are allocated for the DM DMRSs, a modulation order of the resources, of the physical shared channel, that are allocated for the DM DMRSs, a quantity of additional resources, of the physical shared channel, that are allocated for data, a modulation order of the additional resources, of the physical shared channel, that are allocated for the data, or a quantity of layers of the communication.

In a seventh additional aspect, alone or in combination with one or more of the first through sixth aspects, process 700 includes one or more of transmitting an indication of a MCS for the resources allocated for DM DMRSs, or receiving a request for an MCS for the resources allocated for DM DMRSs.

In an eighth additional aspect, alone or in combination with one or more of the first through seventh aspects, process 700 includes determining a MCS for the resources allocated for DM DMRSs based at least in part on one or more of a configured MCS for DM DMRSs, or a configured difference of an MCS for DM DMRSs and an MCS for data of the communication.

In a ninth additional aspect, alone or in combination with one or more of the first through eighth aspects, a MCS for DM DMRSs is lower than an MCS for data of the communication.

Although FIG. 7 shows example blocks of process 700, in some aspects, process 700 may include additional blocks, fewer blocks, different blocks, or differently arranged blocks than those depicted in FIG. 7. Additionally or alternatively, two or more of the blocks of process 700 may be performed in parallel.

Figure 8:
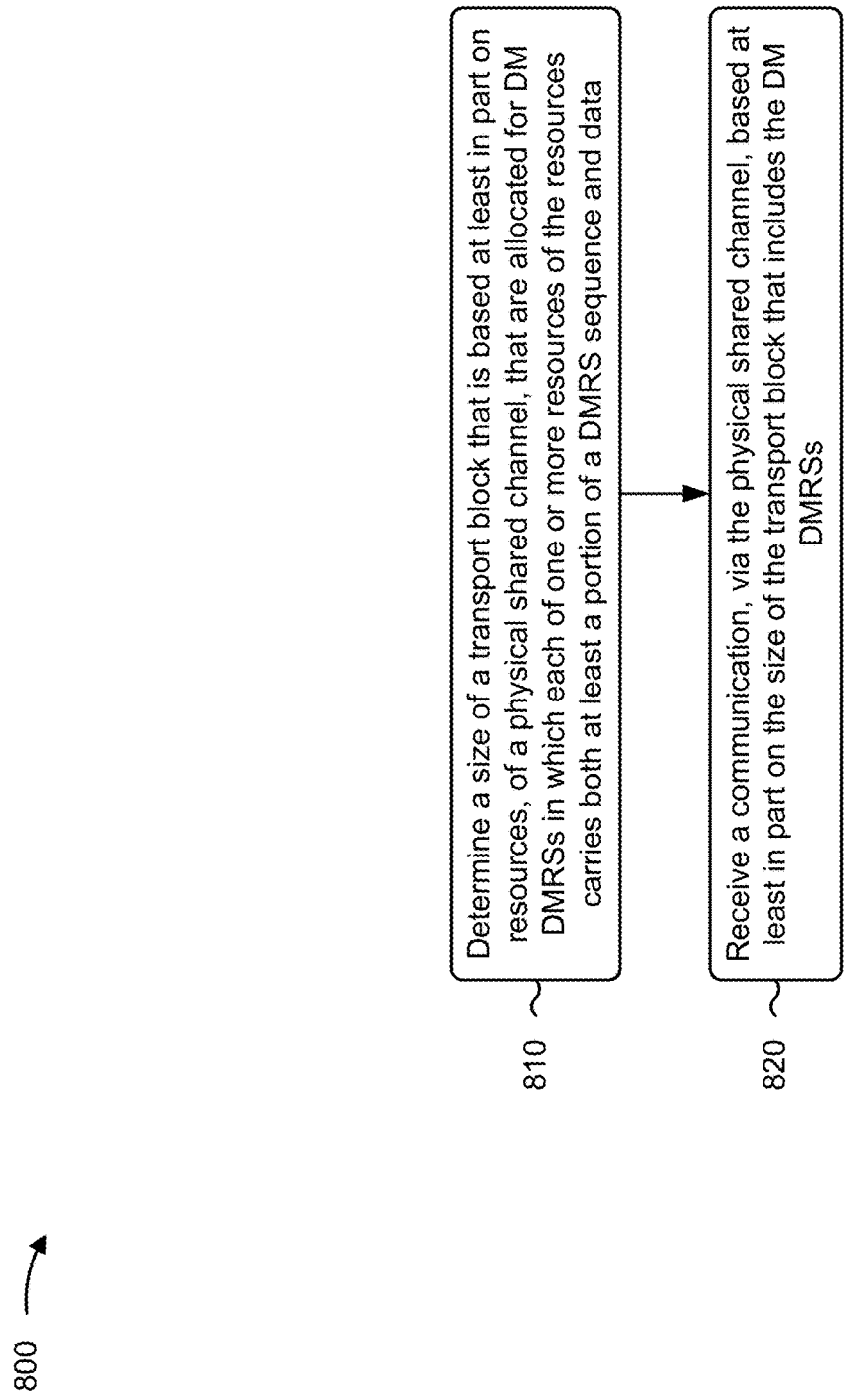

FIG. 8 is a flowchart illustrating an example process 800 performed, for example, by a wireless communication device in accordance with the present disclosure. Example process 800 is an example where the wireless communication device (for example, base station 110 or UE 120) performs operations associated with DM DMRSs.

As shown in FIG. 8, in some aspects, process 800 may include determining a size of a transport block that is based at least in part on resources, of a physical shared channel, that are allocated for DM DMRSs in which each of one or more resources of the resources carries both a DMRS and data (block 810). For example, the wireless communication device (such as by using communication manager 140 or 150 or communication manager 908 or 108, depicted in FIGS. 9 and 10) may determine a size of a transport block that is based at least in part on resources, of a physical shared channel, that are allocated for DM DMRSs in which each of one or more resources of the resources carries both a DMRS and data, as described above.

As further shown in FIG. 8, in some aspects, process 800 may include receiving a communication, via the physical shared channel, based at least in part on the size of the transport block that includes the DM DMRSs (block 820). For example, the wireless communication device (such as by using communication manager 140 or 150 or reception component 902 or 1002, depicted in FIGS. 9 and 10) may receive a communication, via the physical shared channel, based at least in part on the size of the transport block that includes the DM DMRSs, as described above.

Process 800 may include additional aspects, such as any single aspect or any combination of aspects described below or in connection with one or more other processes described elsewhere herein.

In a first additional aspect, determining the size of the transport block comprises receiving, from a transmitting device, an indication of the size of the transport block.

In a second additional aspect, alone or in combination with the first aspect, receiving the indication of the size of the transport block comprises receiving the indication of the size of the transport block via one or more of a DCI message, RRC signaling, or one or more MAC CEs.

In a third additional aspect, alone or in combination with one or more of the first and second aspects, receiving the indication of the size of the transport block comprises receiving the indication of the size of the transport block within a grant that schedules the communication.

In a fourth additional aspect, alone or in combination with one or more of the first through third aspects, determining the size of the transport block comprises determining a capacity for data on the resources, of the physical shared channel, that are allocated for the DM DMRSs, and determining a capacity for data on additional resources, of the physical shared channel, that are allocated for data.

In a fifth additional aspect, alone or in combination with one or more of the first through fourth aspects, the capacity for the data on the resources, of the physical shared channel, that are allocated for the DM DMRSs, is based at least in part on one or more of a quantity of the resources, of the physical shared channel, that are allocated for the DM DMRSs, a configured overhead for the DMRSs, a rule for determining capacities for data on resources allocated for DM DMRSs, a MCS for the resources, of the physical shared channel, that are allocated for the DM DMRSs, or a quantity of layers of the communication.

In a sixth additional aspect, alone or in combination with one or more of the first through fifth aspects, process 800 includes determining an LDPC base graph based at least in part on the size of the transport block.

In a seventh additional aspect, alone or in combination with one or more of the first through sixth aspects, process 800 includes determining the LDPC base graph based at least in part on an effective code rate, wherein the effective code rate is based at least in part on one or more of a total quantity of bits transmitted via the transport block, a quantity of resources, of the physical shared channel, that are allocated for the DM DMRSs, a modulation order of the resources, of the physical shared channel, that are allocated for the DM DMRSs, a quantity of additional resources, of the physical shared channel, that are allocated for data, a modulation order of the additional resources, of the physical shared channel, that are allocated for the data, or a quantity of layers of the communication.

In an eighth additional aspect, alone or in combination with one or more of the first through seventh aspects, process 800 includes one or more of transmitting a request for a MCS for the resources allocated for DM DMRS, or receiving an indication of an MCS for the resources allocated for DM DMRS.

In a ninth additional aspect, alone or in combination with one or more of the first through eighth aspects, process 800 includes determining a MCS for the resources allocated for DM DMRSs based at least in part on one or more of a configured MCS for DM DMRSs, or a configured difference of an MCS for DM DMRSs and an MCS for data of the communication.

In a tenth additional aspect, alone or in combination with one or more of the first through ninth aspects, a MCS for DM DMRSs is lower than an MCS for data of the communication.

Although FIG. 8 shows example blocks of process 800, in some aspects, process 800 may include additional blocks, fewer blocks, different blocks, or differently arranged blocks than those depicted in FIG. 8. Additionally or alternatively, two or more of the blocks of process 800 may be performed in parallel.

Figure 9:
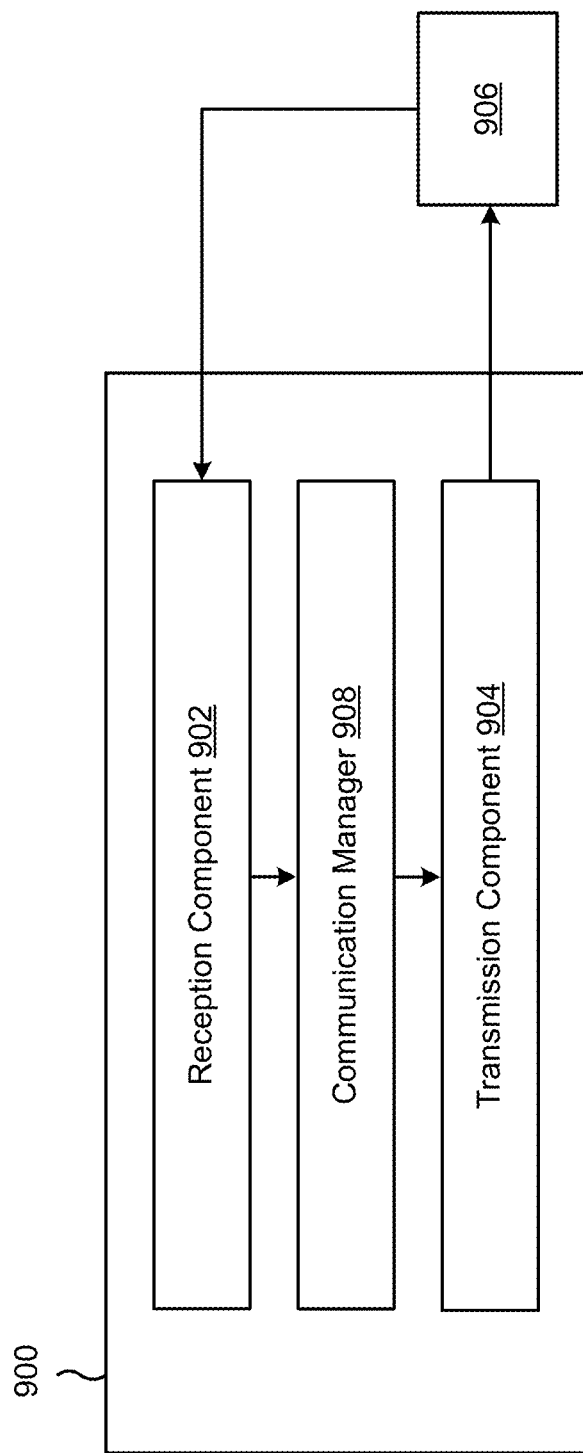
FIGS. 9 and 10 are block diagrams of example apparatuses for wireless communication in accordance with the present disclosure.

FIG. 9 is a block diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses or one or more other components). As shown, the apparatus 900 may communicate with another apparatus 906 (such as a UE, a base station, or another wireless communication device) using the reception component 902 and the transmission component 904. As further shown, the apparatus 900 may include a communication manager 908 (for example, the communication manager 140). The communication manager 908 may include a determination component, among other examples.

In some aspects, the apparatus 900 may be configured to perform one or more operations described herein in connection with FIGS. 3 and 4. Additionally or alternatively, the apparatus 900 may be configured to perform one or more processes described herein, such as process 500 of FIG. 5, process 700 of FIG. 7, process 800 of FIG. 8, or a combination thereof. In some aspects, the apparatus 900 or one or more components shown in FIG. 9 may include one or more components of the UE described in connection with FIG. 2. Additionally or alternatively, one or more components shown in FIG. 9 may be implemented within one or more components described in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the UE described in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the UE described in connection with FIG. 2. In some aspects, the transmission component 904 may be co-located with the reception component 902 in a transceiver.

The transmission component 904 may transmit an indication of a capability of the UE to communicate one or more of uplink communications or downlink communications that include DM DMRSs in which each of one or more resources of a plurality of resources of the uplink communications or the downlink communications carry both at least a portion of a DMRS sequence and data. The transmission component 904 may transmit an uplink communication or receiving a downlink communication that includes the DM DMRSs.

The transmission component 904 may transmit a request to transmit the uplink communication or to receive the downlink communication with the DM DMRSs.

The communication manager 908 may determine that the UE is in a high speed scenario or a high Doppler scenario wherein transmitting the uplink communication or receiving the downlink communication is based at least in part on determining that the UE is in a high speed scenario or a high Doppler scenario.

The reception component 902 may receive an indication of a pattern of the DM DMRSs for the uplink communication or the downlink communication.

The transmission component 904 may transmit a request for a MCS for symbols that carry the DM DMRSs.

The reception component 902 may receive an indication of a MCS for symbols that carry the DM DMRSs wherein the MCS for the symbols that carry the DM DMRSs is different than an MCS for data symbols.

The communication manager 908 may determine a MCS for transmitting the uplink communication or for receiving the downlink communication that includes the DM DMRSs based at least in part on a configured MCS for the DM DMRSs, or a configured difference of an MCS for the DM DMRSs and an MCS for other data of the uplink communication or the downlink communication.

The communication manager 908 may apply scaling to the outermost constellation points to normalize an average energy for resources of the uplink communication or the downlink communication.

The communication manager 908 may determine a size of a transport block based at least in part on resources, of a physical shared channel, that are allocated for DM DMRSs in which each of one or more resources of the resources carries both a DMRS and data. The transmission component 904 may transmit a communication, via the physical shared channel, based at least in part on the size of the transport block that includes the DM DMRSs.

The communication manager 908 may determine a size of a resource allocation for transmitting the communication based at least in part on the size of the transport block.

The transmission component 904 may transmit, to a receiving device, an indication of the size of the transport block that is based at least in part on resources, of a physical shared channel, that are allocated for DM DMRSs in which each of one or more resources of the resources carries both a DMRS and data.

The communication manager 908 may determine an LDPC base graph based at least in part on the size of the transport block.

The communication manager 908 may determine an LDPC base graph based at least in part on an effective code rate, wherein the effective code rate is based at least in part on one or more of a total quantity of bits to be transmitted via the transport block, a quantity of resources, of the physical shared channel, that are allocated for the DM DMRSs, a modulation order of the resources, of the physical shared channel, that are allocated for the DM DMRSs, a quantity of additional resources, of the physical shared channel, that are allocated for data, a modulation order of the additional resources, of the physical shared channel, that are allocated for the data, or a quantity of layers of the communication.

The communication manager 908 may determine a MCS for the resources allocated for DM DMRSs based at least in part on one or more of a configured MCS for DM DMRSs, or a configured difference of an MCS for DM DMRSs and an MCS for data of the communication.

The communication manager 908 may determine a size of a transport block that is based at least in part on resources, of a physical shared channel, that are allocated for DM DMRSs in which each of one or more resources of the resources carries both a DMRS and data. The reception component 902 may receive a communication, via the physical shared channel, based at least in part on the size of the transport block that includes the DM DMRSs.

The communication manager 908 may determine an LDPC base graph based at least in part on the size of the transport block.

The communication manager 908 may determine the LDPC base graph based at least in part on an effective code rate, wherein the effective code rate is based at least in part on one or more of a total quantity of bits transmitted via the transport block, a quantity of resources, of the physical shared channel, that are allocated for the DM DMRSs, a modulation order of the resources, of the physical shared channel, that are allocated for the DM DMRSs, a quantity of additional resources, of the physical shared channel, that are allocated for data, a modulation order of the additional resources, of the physical shared channel, that are allocated for the data, or a quantity of layers of the communication.

The communication manager 908 may determine a MCS for the resources allocated for DM DMRSs based at least in part on one or more of a configured MCS for DM DMRSs, or a configured difference of an MCS for DM DMRSs and an MCS for data of the communication.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally or alternatively, a set of (one or more) components shown in FIG. 9 may perform one or more functions described as being performed by another set of components shown in FIG. 9.

Figure 10:
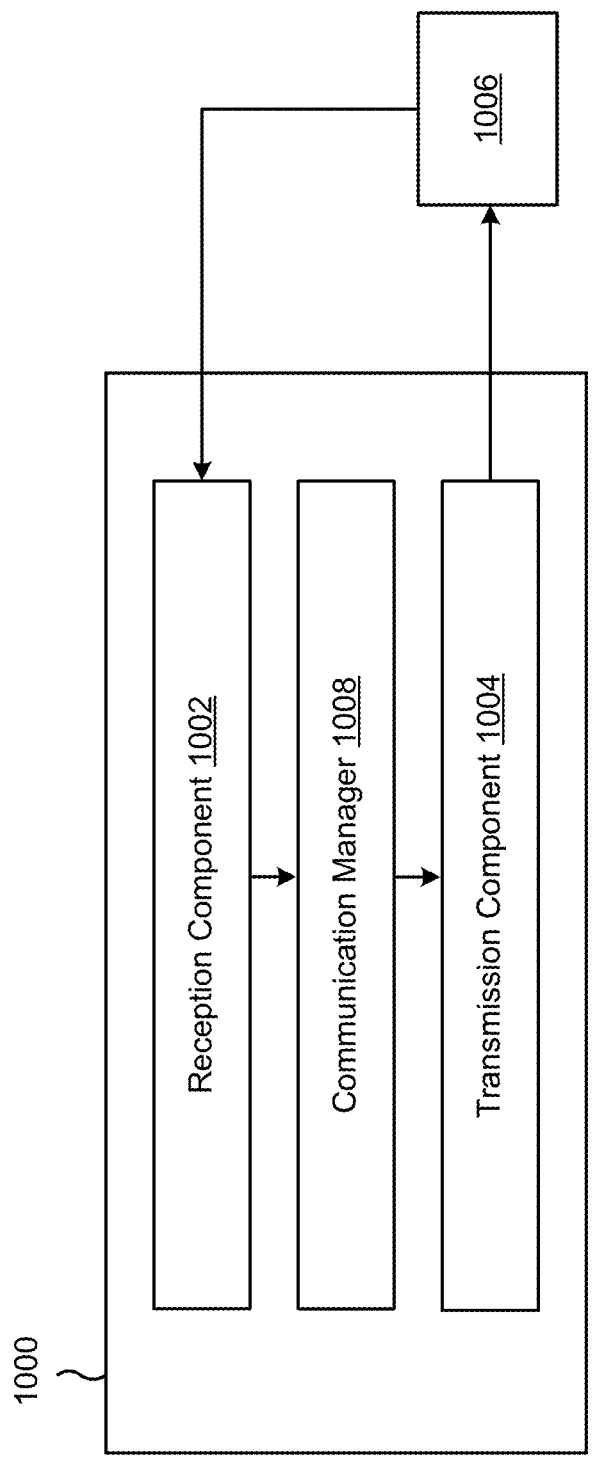

FIG. 10 is a block diagram of an example apparatus 1000 for wireless communication. The apparatus 1000 may be a base station, or a base station may include the apparatus 1000. In some aspects, the apparatus 1000 includes a reception component 1002 and a transmission component 1004, which may be in communication with one another (for example, via one or more buses or one or more other components). As shown, the apparatus 1000 may communicate with another apparatus 1006 (such as a UE, a base station, or another wireless communication device) using the reception component 1002 and the transmission component 1004. As further shown, the apparatus 1000 may include a communication manager 1008 (for example, the communication manager 140). The communication manager 1008 may include a determination component, among other examples.

In some aspects, the apparatus 1000 may be configured to perform one or more operations described herein in connection with FIGS. 3 and 5. Additionally or alternatively, the apparatus 1000 may be configured to perform one or more processes described herein, such as process 600 of FIG. 6, process 700 of FIG. 7, process 800 of FIG. 8, or a combination thereof. In some aspects, the apparatus 1000 or one or more components shown in FIG. 10 may include one or more components of the base station described in connection with FIG. 2. Additionally or alternatively, one or more components shown in FIG. 10 may be implemented within one or more components described in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a demodulator, a MIMO detector, a receive processor, a controller/processor, a memory, or a combination thereof, of the base station described in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the base station described in connection with FIG. 2. In some aspects, the transmission component 1004 may be co-located with the reception component 1002 in a transceiver.

The reception component 1002 may receive an indication of a capability of a UE to communicate one or more of uplink communications or downlink communications that include DM DMRSs in which each of one or more resources of a plurality of resources of the uplink communications or the downlink communications carry both at least a portion of a DMRS sequence and data. The transmission component 1004 may transmit a downlink communication to the UE or receiving an uplink communication from the UE that includes the DM DMRSs.

The reception component 1002 may receive, from the UE, a request to transmit the downlink communication or to receive the uplink communication with the DM DMRSs.

The communication manager 1008 may determine that the UE is in a high speed scenario or a high Doppler scenario wherein transmitting the uplink communication or receiving the downlink communication is based at least in part on determining that the UE is in a high speed scenario or a high Doppler scenario.

The transmission component 1004 may transmit an indication of a pattern of the DM DMRSs for the uplink communication or the downlink communication.

The transmission component 1004 may transmit the downlink communication or receiving the uplink communication with at least one DMRS that is not data-modulated.

The reception component 1002 may receive a request for a MCS for symbols that carry the DM DMRS.

The transmission component 1004 may transmit an indication of a MCS for symbols that carry the DM DMRSs.

The communication manager 1008 may determine a MCS for communicating the uplink communication or the downlink communication having the DM DMRSs based at least in part on one or more of a configured MCS for the DM DMRSs, or a configured difference of an MCS for the DM DMRSs and an MCS for other data of the uplink communication or the downlink communication.

The communication manager 1008 may apply scaling to the outermost constellation points to normalize average energy for resources of the uplink communication or the downlink communication.

The communication manager 1008 may determine a size of a transport block based at least in part on resources, of a physical shared channel, that are allocated for DM DMRSs in which each of one or more resources of the resources carries both a DMRS and data. The transmission component 1004 may transmit a communication, via the physical shared channel, based at least in part on the size of the transport block that includes the DM DMRSs.

The communication manager 1008 may determine a size of a resource allocation for transmitting the communication based at least in part on the size of the transport block.

The transmission component 1004 may transmit, to a receiving device, an indication of the size of the transport block that is based at least in part on resources, of a physical shared channel, that are allocated for DM DMRSs in which each of one or more resources of the resources carries both a DMRS and data.

The communication manager 1008 may determine an LDPC base graph based at least in part on the size of the transport block.

The communication manager 1008 may determine an LDPC base graph based at least in part on an effective code rate, wherein the effective code rate is based at least in part on one or more of a total quantity of bits to be transmitted via the transport block, a quantity of resources, of the physical shared channel, that are allocated for the DM DMRSs, a modulation order of the resources, of the physical shared channel, that are allocated for the DM DMRSs, a quantity of additional resources, of the physical shared channel, that are allocated for data, a modulation order of the additional resources, of the physical shared channel, that are allocated for the data, or a quantity of layers of the communication.

The communication manager 1008 may determine a MCS for the resources allocated for DM DMRSs based at least in part on one or more of a configured MCS for DM DMRSs, or a configured difference of an MCS for DM DMRSs and an MCS for data of the communication.

The communication manager 1008 may determine a size of a transport block that is based at least in part on resources, of a physical shared channel, that are allocated for DM DMRSs in which each of one or more resources of the resources carries both a DMRS and data. The reception component 1002 may receive a communication, via the physical shared channel, based at least in part on the size of the transport block that includes the DM DMRSs.

The communication manager 1008 may determine an LDPC base graph based at least in part on the size of the transport block.

The communication manager 1008 may determine the LDPC base graph based at least in part on an effective code rate, wherein the effective code rate is based at least in part on one or more of a total quantity of bits transmitted via the transport block, a quantity of resources, of the physical shared channel, that are allocated for the DM DMRSs, a modulation order of the resources, of the physical shared channel, that are allocated for the DM DMRSs, a quantity of additional resources, of the physical shared channel, that are allocated for data, a modulation order of the additional resources, of the physical shared channel, that are allocated for the data, or a quantity of layers of the communication.

The communication manager 1008 may determine a MCS for the resources allocated for DM DMRSs based at least in part on one or more of a configured MCS for DM DMRSs, or a configured difference of an MCS for DM DMRSs and an MCS for data of the communication.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a user equipment (UE), comprising: transmitting an indication of a capability of the UE to communicate one or more of uplink communications or downlink communications that include data-modulated demodulation reference signals (DMRSs) in which each of one or more resources of a plurality of resources of the uplink communications or the downlink communications carry both at least a portion of a DMRS sequence and data; and transmitting an uplink communication or receiving a downlink communication that includes the data-modulated DMRSs.

Aspect 2: The method of Aspect 1, further comprising transmitting a request to transmit the uplink communication or to receive the downlink communication with the data-modulated DMRSs.

Aspect 3: The method of Aspect 2, further comprising transmitting a request for a modulation and coding scheme (MCS) for symbols that carry the data-modulated DMRSs, comprising transmitting the request for the MCS with the request to transmit the uplink communication or to receive the downlink communication with the data-modulated DMRSs.

Aspect 4: The method of any of Aspects 1-3, further comprising determining that the UE is in a high speed scenario or a high Doppler scenario, wherein transmitting the uplink communication or receiving the downlink communication is based at least in part on determining that the UE is in a high speed scenario or a high Doppler scenario.

Aspect 5: The method of any of Aspects 1-4, wherein the uplink communication or the downlink communication further includes at least one DMRS that is not data-modulated.

Aspect 6: The method of any of Aspects 1-5, further comprising receiving an indication of a modulation and coding scheme (MCS) for symbols that carry the data-modulated DMRSs, wherein the MCS for the symbols that carry the DM DMRSs is different than an MCS for data symbols.

Aspect 7: The method of Aspect 6, wherein the indication of the MCS indicates a difference between the MCS for symbols that carry the data-modulated DMRSs and an MCS for symbols that carry other data of the uplink communication or the downlink communication.

Aspect 8: The method of any of Aspects 1-4, wherein the one or more processors are further configured to determine a modulation and coding scheme (MCS) for transmitting the uplink communication or for receiving the downlink communication that includes the data-modulated DMRSs based at least in part on: a configured MCS for the data-modulated DMRSs, or a configured difference of an MCS for the data-modulated DMRSs and an MCS for other data of the uplink communication or the downlink communication.

Aspect 9: The method of any of Aspects 1-8, wherein a constellation of the data-modulated DMRSs is based at least in part on outermost constellation points of other data of the uplink communication or the downlink communication.

Aspect 10: The method of any of Aspects 1-9, comprising scrambling the data-modulated DMRSs separately from other data of the uplink communication, or comprising descrambling the data-modulated DMRSs separately from other data of the uplink communication.

Aspect 11: The method of any of Aspects 1-10, wherein the uplink communication or the downlink communication includes a multi-layered communication, wherein the one or more processors, to transmit the uplink communication or receiving the downlink communication, are configured to transmit the uplink communication or receiving the downlink communication including the data-modulated DMRSs on only one layer of the multi-layered communication, wherein the one or more processors, to transmit the uplink communication or receiving the downlink communication, are configured to transmit the uplink communication or receiving the downlink communication including the data-modulated DMRSs on a subset of layers of the multi-layered communication, or wherein the one or more processors, to transmit the uplink communication or receiving the downlink communication, are configured to transmit the uplink communication or receiving the downlink communication including the data-modulated DMRSs on all layers of the multi-layered communication.

Aspect 12: The method of any of Aspects 1-11, further comprising receiving an indication of a size of a transport block that is based at least in part on resources, of a physical shared channel, that are allocated for data-modulated DMRSs.

Aspect 13: The method of Aspect 12, wherein the size of the transport block is based at least in part on: a capacity for data on the resources, of the physical shared channel, that are allocated for the data-modulated DMRSs, and a capacity for data on additional resources, of a physical shared channel, that are allocated for data.

Aspect 14: The method of any of Aspects 12-13, wherein the one or more processors are further configured to determine a low-density parity-check (LDPC) base graph based at least in part on an effective code rate, wherein the effective code rate is based at least in part on one or more of: a total quantity of bits to be transmitted via the transport block, a quantity of resources, of the physical shared channel, that are allocated for the data-modulated DMRSs, a modulation order of the resources, of the physical shared channel, that are allocated for the data-modulated DMRSs, a quantity of additional resources, of the physical shared channel, that are allocated for data, a modulation order of the additional resources, of the physical shared channel, that are allocated for the data, or a quantity of layers of the communication.

Aspect 15: A method of wireless communication performed by a base station, comprising: receiving an indication of a capability of a user equipment (UE) to communicate one or more of uplink communications or downlink communications that include data-modulated demodulation reference signals (DMRSs) in which each of one or more resources of a plurality of resources of the uplink communications or the downlink communications carry both at least a portion of a DMRS sequence and data; and receiving an uplink communication or receiving a downlink communication that includes the data-modulated DMRSs.

Aspect 16: The method of Aspect 15, further comprising receiving a request to receive the uplink communication or to transmit the downlink communication with the data-modulated DMRSs.

Aspect 17: The method of Aspect 16, further comprising receiving a request for a modulation and coding scheme (MCS) for symbols that carry the data-modulated DMRSs, comprising receiving the request for the MCS with the request to receive the uplink communication or to transmit the downlink communication with the data-modulated DMRSs.

Aspect 18: The method of any of Aspects 15-17, further comprising determining that the UE is in a high speed scenario or a high Doppler scenario, wherein receiving the uplink communication or transmitting the downlink communication is based at least in part on determining that the UE is in a high speed scenario or a high Doppler scenario.

Aspect 19: The method of any of Aspects 15-18, wherein the uplink communication or the downlink communication further includes at least one DMRS that is not data-modulated.

Aspect 20: The method of any of Aspects 15-19, further comprising transmitting an indication of a modulation and coding scheme (MCS) for symbols that carry the data-modulated DMRSs, wherein the MCS for the symbols that carry the DM DMRSs is different than an MCS for data symbols.

Aspect 21: The method of Aspect 20, wherein the indication of the MCS indicates a difference between the MCS for symbols that carry the data-modulated DMRSs and an MCS for symbols that carry other data of the uplink communication or the downlink communication.

Aspect 22: The method of any of Aspects 15-21, wherein the one or more processors are further configured to determine a modulation and coding scheme (MCS) for receiving the uplink communication or for transmitting the downlink communication that includes the data-modulated DMRSs based at least in part on: a configured MCS for the data-modulated DMRSs, or a configured difference of an MCS for the data-modulated DMRSs and an MCS for other data of the uplink communication or the downlink communication.

Aspect 23: The method of any of Aspects 15-22, wherein the one or more processors, to receive the uplink communication, are configured to de-scrambling the data-modulated DMRSs separately from other data of the uplink communication, or comprising scrambling the data-modulated DMRSs separately from other data of the uplink communication.

Aspect 24: The method of any of Aspects 15-23, further comprising transmitting an indication of a size of a transport block that is based at least in part on resources, of a physical shared channel, that are allocated for data-modulated DMRSs.

Aspect 25: The method of Aspect 24, wherein the size of the transport block is based at least in part on: a capacity for data on the resources, of the physical shared channel, that are allocated for the data-modulated DMRSs, and a capacity for data on additional resources, of a physical shared channel, that are allocated for data.

Aspect 26: The method of any of Aspects 24-25, wherein the one or more processors are further configured to determine a low-density parity-check (LDPC) base graph based at least in part on an effective code rate, wherein the effective code rate is based at least in part on one or more of: a total quantity of bits to be transmitted via the transport block, a quantity of resources, of the physical shared channel, that are allocated for the data-modulated DMRSs, a modulation order of the resources, of the physical shared channel, that are allocated for the data-modulated DMRSs, a quantity of additional resources, of the physical shared channel, that are allocated for data, a modulation order of the additional resources, of the physical shared channel, that are allocated for the data, or a quantity of layers of the communication.

Aspect 27: An apparatus for wireless communication at a device, comprising a processor; memory coupled with the processor; and instructions stored in the memory and executable by the processor to cause the apparatus to perform the method of one or more of Aspects 1-26.

Aspect 28: A device for wireless communication, comprising a memory and one or more processors coupled to the memory, the one or more processors configured to perform the method of one or more of Aspects 1-26.

Aspect 29: An apparatus for wireless communication, comprising at least one means for performing the method of one or more of Aspects 1-26.

Aspect 30: A non-transitory computer-readable medium storing code for wireless communication, the code comprising instructions executable by a processor to perform the method of one or more of Aspects 1-26.

Aspect 31: A non-transitory computer-readable medium storing a set of instructions for wireless communication, the set of instructions comprising one or more instructions that, when executed by one or more processors of a device, cause the device to perform the method of one or more of Aspects 1-26.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software. It will be apparent that systems or methods described herein may be implemented in different forms of hardware, firmware, or a combination of hardware and software. The actual specialized control hardware or software code used to implement these systems or methods is not limiting of the aspects. Thus, the operation and behavior of the systems or methods were described herein without reference to specific software code—it being understood that software and hardware can be designed to implement the systems or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, or not equal to the threshold, among other examples.

Even though particular combinations of features are recited in the claims or disclosed in the specification, these combinations are not intended to limit the disclosure of various aspects. In fact, many of these features may be combined in ways not specifically recited in the claims or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (for example, related items, unrelated items, or a combination of related and unrelated items), and may be used interchangeably with "one or more." Where only one item is intended, the phrase "only one" or similar language is used. Also, as used herein, the terms "has," "have," "having," and similar terms are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (for example, if used in combination with "either" or "only one of").

What is claimed is:

1. A user equipment (UE) for wireless communication, comprising:
   a memory; and
   one or more processors, coupled to the memory, configured to:
      transmit an indication of a capability of the UE to communicate one or more communications that include data-modulated demodulation reference signals (DMRSs) in which each of one or more resources of a plurality of resources of the one or more communications carry both at least a portion of a DMRS sequence and data,
         wherein a constellation of the data-modulated DMRSs is based at least in part on outermost constellation points of other data of the one or more communications; and
      transmit or receive the one or more communications.

2. The UE of claim 1, wherein the one or more processors are further configured to transmit a request to transmit or receive the one or more communications with the data-modulated DMRSs.

3. The UE of claim 2, wherein the one or more processors are further configured to transmit a request for a modulation and coding scheme (MCS) for symbols that carry the data-modulated DMRSs; and
   wherein the one or more processors, to transmit the request for the MCS, are configured to:
      transmit the request for the MCS with the request to transmit or receive the one or more communications with the data-modulated DMRSs.

4. The UE of claim 1, wherein the one or more processors are further configured to determine that the UE is in a high speed scenario or a high Doppler scenario; and
   wherein the one or more processors, to transmit or receive the one or more communications, are configured to:
      transmit or receive the one or more communications based at least in part on determining that the UE is in a high speed scenario or a high Doppler scenario.

5. The UE of claim 1, wherein the one or more communications further include at least one DMRS that is not data-modulated.

6. The UE of claim 1, wherein the one or more processors are further configured to receive an indication of a modulation and coding scheme (MCS) for symbols that carry the data-modulated DMRSs,
   wherein the MCS for the symbols that carry the data-modulated DMRSs is different than an MCS for data symbols.

7. The UE of claim 6, wherein the indication of the MCS indicates a difference between the MCS for symbols that carry the data-modulated DMRSs and an MCS for symbols that carry other data of the one or more communications.

8. The UE of claim 1, wherein the one or more processors are further configured to determine a modulation and coding scheme (MCS) for transmitting or receiving the one or more communications based at least in part on:
   a configured MCS for the data-modulated DMRSs, or
   a configured difference of an MCS for the data-modulated DMRSs and an MCS for other data of the one or more communications.

9. The UE of claim 1, wherein the one or more processors, to transmit the one or more communications, are configured to scramble the data-modulated DMRSs separately from other data of the one or more communications, or
   wherein the one or more processors, to receive the one or more communications, are configured to descramble the data-modulated DMRSs separately from other data of the one or more communications.

10. The UE of claim 1, wherein the one or more communications include a multi-layered communication; and wherein the one or more processors, to transmit or receive the one or communications, are configured to transmit or receive the one or communications on only one layer of the multi-layered communication, on a subset of layers of the multi-layered communication, or on all layers of the multi-layered communication.

11. The UE of claim 1, wherein the one or more processors are further configured to receive an indication of a size of a transport block that is based at least in part on resources, of a physical shared channel, that are allocated for data-modulated DMRSs.

12. The UE of claim 11, wherein the size of the transport block is based at least in part on:
a capacity for data on the resources, of the physical shared channel, that are allocated for the data-modulated DMRSs, and
a capacity for data on additional resources, of the physical shared channel, that are allocated for data.

13. The UE of claim 11, wherein the one or more processors are further configured to determine a low-density parity-check (LDPC) base graph based at least in part on an effective code rate, wherein the effective code rate is based at least in part on one or more of:
a total quantity of bits to be transmitted via the transport block,
a quantity of the resources, of the physical shared channel, that are allocated for the data-modulated DMRSs,
a modulation order of the resources, of the physical shared channel, that are allocated for the data-modulated DMRSs,
a quantity of additional resources, of the physical shared channel, that are allocated for data,
a modulation order of the additional resources, of the physical shared channel, that are allocated for the data, or
a quantity of layers of the one or more communications.

14. A network entity for wireless communication, comprising:
a memory; and
one or more processors, coupled to the memory, configured to:
receive an indication of a capability of a user equipment (UE) to communicate one or more communications that include data-modulated demodulation reference signals (DMRSs) in which each of one or more resources of a plurality of resources of the one or more communications carry both at least a portion of a DMRS sequence and data,
wherein a constellation of the data-modulated DMRSs is based at least in part on outermost constellation points of other data of the one or more communications; and
receive or transmit the one or more communications.

15. The network entity of claim 14, wherein the one or more processors are further configured to receive a request to receive or transmit the one or more communications with the data-modulated DMRSs.

16. The network entity of claim 15, wherein the one or more processors are further configured to receive a request for a modulation and coding scheme (MCS) for symbols that carry the data-modulated DMRSs; and
wherein the one or more processors, to receive the request for the MCS, are configured to:
receive the request for the MCS with the request to receive or transmit the one or more communications with the data-modulated DMRSs.

17. The network entity of claim 14, wherein the one or more processors are further configured to determine that the UE is in a high speed scenario or a high Doppler scenario; and
wherein the one or more processors, to receive or transmit the one or more communications, are configured to:
receive or transmit the one or more communications based at least in part on determining that the UE is in a high speed scenario or a high Doppler scenario.

18. The network entity of claim 14, wherein the one or more communications further include at least one DMRS that is not data-modulated.

19. The network entity of claim 14, wherein the one or more processors are further configured to transmit an indication of a modulation and coding scheme (MCS) for symbols that carry the data-modulated DMRSs,
wherein the MCS for the symbols that carry the data-modulated DMRSs is different than an MCS for data symbols.

20. The network entity of claim 19, wherein the indication of the MCS indicates a difference between the MCS for symbols that carry the data-modulated DMRSs and an MCS for symbols that carry other data of the one or more communications.

21. The network entity of claim 14, wherein the one or more processors are further configured to determine a modulation and coding scheme (MCS) for receiving or transmitting the one or more communications based at least in part on:
a configured MCS for the data-modulated DMRSs, or
a configured difference of an MCS for the data-modulated DMRSs and an MCS for other data of the one or more communications.

22. The network entity of claim 14, wherein the one or more processors, to receive the one or more communications, are configured to de-scramble the data-modulated DMRSs separately from other data of the one or more communications, or
wherein the one or more processors, to transmit the one or more communications, are configured to scramble the data-modulated DMRSs separately from other data of the one or more communications.

23. The network entity of claim 14, wherein the one or more processors are further configured to transmit an indication of a size of a transport block that is based at least in part on resources, of a physical shared channel, that are allocated for data-modulated DMRSs.

24. The network entity of claim 23, wherein the size of the transport block is based at least in part on:
a capacity for data on the resources, of the physical shared channel, that are allocated for the data-modulated DMRSs, and
a capacity for data on additional resources, of the physical shared channel, that are allocated for data.

25. The network entity of claim 23, wherein the one or more processors are further configured to determine a low-density parity-check (LDPC) base graph based at least in part on an effective code rate, wherein the effective code rate is based at least in part on one or more of:
a total quantity of bits to be transmitted via the transport block,
a quantity of the resources, of the physical shared channel, that are allocated for the data-modulated DMRSs,
a modulation order of the resources, of the physical shared channel, that are allocated for the data-modulated DMRSs, a quantity of additional resources, of the physical shared channel, that are allocated for data, a modulation order of the additional resources, of the physical shared channel, that are allocated for the data, or a quantity of layers of the one or more communications.

26. A method of wireless communication performed by a user equipment (UE), comprising:

transmitting an indication of a capability of the UE to communicate one or more communications that include data-modulated demodulation reference signals (DMRSs) in which each of one or more resources of a plurality of resources of the one or more communications carry both at least a portion of a DMRS sequence and data, wherein a constellation of the data-modulated DMRSs is based at least in part on outermost constellation points of other data of the one or more communications; and transmitting or receiving the one or more communications.

27. The method of claim 26, further comprising receiving an indication of a size of a transport block that is based at least in part on resources, of a physical shared channel, that are allocated for data-modulated DMRSs.

28. A method of wireless communication performed by a network entity, comprising:

receiving an indication of a capability of a user equipment (UE) to communicate one or more communications that include data-modulated demodulation reference signals (DMRSs) in which each of one or more resources of a plurality of resources of the one or more communications carry both at least a portion of a DMRS sequence and data, wherein a constellation of the data-modulated DMRSs is based at least in part on outermost constellation points of other data of the one or more communications; and receiving transmitting the one or more communications.

29. The method of claim 28, further comprising transmitting an indication of a size of a transport block that is based at least in part on resources, of a physical shared channel, that are allocated for data-modulated DMRSs.

30. The method of claim 26, further comprising:

transmitting a request for a modulation and coding scheme (MCS), for symbols that carry the data-modulated DMRSs, with a request to transmit or receive the one or more communications with the data-modulated DMRSs.

* * * * *